(12) United States Patent
Shang et al.

(10) Patent No.: US 12,731,200 B2
(45) Date of Patent: Sep. 8, 2026

(54) DATA MANAGEMENT METHOD AND APPARATUS

(71) Applicant: Yinwang Intelligent Technologies Co., Ltd., Shenzhen (CN)

(72) Inventors: Yu Shang, Shenzhen (CN); Jiangqi Li, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 57 days.

(21) Appl. No.: 18/759,604

(22) Filed: Jun. 28, 2024

(65) Prior Publication Data

US 2024/0354883 A1 Oct. 24, 2024

Related U.S. Application Data

(63) Continuation of application No. PCT/CN2021/144004, filed on Dec. 31, 2021.

(51) Int. Cl.

*H04L 9/40* (2022.01)
*G06Q 50/26* (2012.01)

(52) U.S. Cl.

CPC ........... *G06Q 50/265* (2013.01); *H04L 63/20* (2013.01)

(58) Field of Classification Search

CPC .............................. H04L 63/20; G06Q 50/265
USPC ........................................................... 726/26
See application file for complete search history.

(56) References Cited

U.S. PATENT DOCUMENTS

| | | | | |
|---|---|---|---|---|
| 7,630,986 B1 * | 12/2009 | Herz | G06Q 30/0603 | 707/999.009 |
| 7,689,832 B2 * | 3/2010 | Talmor | H04L 9/3249 | 713/186 |
| 8,942,433 B2 * | 1/2015 | Small | G06Q 50/10 | 382/116 |
| 9,928,379 B1 * | 3/2018 | Hoffer | G16H 50/20 | |

FOREIGN PATENT DOCUMENTS

| | | |
|---|---|---|
| CN | 107347114 A | 11/2017 |
| CN | 112219383 A | 1/2021 |
| CN | 113783774 A | 12/2021 |
| WO | 2022252226 A1 | 12/2022 |

OTHER PUBLICATIONS

International Search Report and Written Opinion in International Appln. No. PCT/CN2021/144004, mailed on Sep. 27, 2022, 17 pages (with English translation).
Extended European Search Report in European Appln. No. 21969836.2, mailed on Dec. 12, 2024, 8 pages.

* cited by examiner

*Primary Examiner* — Anthony D Brown
(74) *Attorney, Agent, or Firm* — Fish & Richardson P.C.

(57) ABSTRACT

Example data management methods and apparatus are described. One example method includes: A privacy center module obtains a privacy configuration file. The privacy center module obtains a privacy policy file based on the privacy configuration file, where the privacy policy file includes at least one of the following: first configuration information indicating an access permission between a business and a service or an access permission between businesses, or second configuration information indicating an access permission of a business. The privacy center module sends the privacy policy file to a privacy proxy module, where the privacy policy file is used for access control of a middleware module.

20 Claims, 16 Drawing Sheets

Processing module

Middleware module

Privacy proxy module

S1301: Send data sharing request information (a first identifier)

S1302: Send first query information (the first identifier)

S1303: Based on the first identifier and a privacy policy file, determine whether to approve a request of the data sharing request information S1304: Send first response information

1900

Processing module 1901

Privacy proxy module 1902

Middleware module 1903

DATA MANAGEMENT METHOD AND APPARATUS

CROSS-REFERENCE TO RELATED APPLICATIONS

This application is a continuation of International Application No. PCT/CN2021/144004, filed on Dec. 31, 2021, the disclosure of which is hereby incorporated by reference in its entirety.

TECHNICAL FIELD

This application relates to the field of intelligent control, and in particular, to a data management method and an apparatus.

BACKGROUND

Conventional privacy management and control technologies mainly focus on the internet industry. Specifically, smart electronic products, such as a mobile phone, have become an important field for the development of privacy protection technologies. In recent years, with development of intelligent driving, more services of intelligent connected vehicles are carried by vehicles, which brings convenience to people's life. However, consequently, privacy protection of an intelligent vehicle has become a key area of research in the industry.

Privacy protection of the intelligent vehicle greatly differs from that of a mobile phone system. First, personal data is more diversified in an intelligent driving scenario. Almost all privacy data in a mobile phone is included in an intelligent cockpit. Further, a driving habit generated based on vehicle driving control, physical condition data of a passenger measured by a motion sensor in the vehicle, and the like become the unique personal privacy data in the vehicle. In addition, different from a mobile phone that has a single system, the vehicle has more diversified systems. Because different electronic control units (ECUs) in one vehicle are usually provided by different suppliers to a vehicle factory for assembly and integration, system information of the vehicle is usually heterogeneously structured across components. Therefore, how to build a secure privacy protection mechanism for the intelligent vehicle is an urgent problem to be solved.

SUMMARY

This application provides a data management method and apparatus, to improve security and efficiency of privacy management and control.

According to a first aspect, a data management method is provided. The method is applied to a vehicle. The vehicle includes a privacy center module, a privacy proxy module, and a middleware module. The privacy center module is configured to implement a privacy configuration function. The privacy proxy module is configured to implement a privacy control function. The middleware module is configured to provide a service-oriented architecture SOA-based interface for a service. The method includes: The privacy center module obtains a privacy configuration file. The privacy center module obtains a privacy policy file based on the privacy configuration file, where the privacy policy file includes at least one of the following: first configuration information indicating an access permission between a business and a service or an access permission between businesses, and second configuration information indicating an access permission of a business. The privacy center module sends the privacy policy file to the privacy proxy module, where the privacy policy file is used for access control of the middleware module.

A privacy configuration solution based on an SOA for a vehicle is provided. A privacy center module is used to obtain a privacy configuration file, generate a privacy policy file, and distribute the privacy policy file to a privacy proxy module close to a business. The privacy proxy module is configured to manage and control, based on the privacy policy file, privacy data of a business processed by a middleware module, so that all businesses in the vehicle cannot bypass privacy management and control. This provides an end-to-end privacy management and control service from a business end to a bottom-layer data end. Associating a privacy configuration of a user with a data service-oriented interface at a bottom layer of a system can provide centralized privacy management and control for a heterogeneous architecture in the vehicle. In this way, security and efficiency of privacy management and control can be improved.

With reference to the first aspect, in some implementations of the first aspect, that the privacy center module obtains a privacy policy file based on the privacy configuration file includes: The privacy center module presents a privacy configuration option to a user in a display interface based on the privacy configuration file, where the privacy configuration option is used by the user to select at least one of the following: whether to authorize a business to invoke data of at least one service, and whether to authorize the business to invoke data of at least one other business. The privacy center module obtains a result of selection performed by the user on the privacy configuration option. The privacy center module obtains the privacy policy file based on the selection result.

The privacy center module binds every business with an approval state of the user. In this case, a business behavior needs to comply with a user's intent, and the user's intent cannot be bypassed. In this way, a solution for privacy protection from a business end to a data end is implemented.

With reference to the first aspect, in some implementations of the first aspect, the privacy configuration file includes privacy rating information. The privacy rating information indicates privacy levels of data corresponding to different service identifiers. The service identifier is an identifier indicating a data provider.

With reference to the first aspect, in some implementations of the first aspect, quantization values are used in the privacy rating information to distinguish between the privacy levels of data.

For a problem that there are various types of privacy data but there is no centralized management and control mechanism, sources providing data are classified based on service identifiers. Based on a service-oriented platform, in addition to the service identifier, a quantitative tag is used in data classification and rating. The privacy rating information is associated with the service identifier, to identify and manage privacy data during business processing based on the SOA. In this way, quantitative assessment of the data privacy sensitivity level can be implemented, to improve efficiency of privacy data management of the vehicle.

With reference to the first aspect, in some implementations of the first aspect, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data, where the client identifier is an identifier indicating a data invoker, and the service identifier is an identifier indicating a data provider.

With reference to the first aspect, in some implementations of the first aspect, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data, where the client identifier is an identifier indicating a data invoker, the service identifier is an identifier indicating a data provider, and the process identifier is an identifier of a business that is run as a process.

With reference to the first aspect, in some implementations of the first aspect, the privacy configuration file includes at least one of the following: an identifier defining a business; an identifier defining a service; an identifier defining a different data life cycle stage; information indicating an association relationship between a business and a service; and information indicating an association relationship between businesses.

With reference to the first aspect, in some implementations of the first aspect, the identifier defining a business includes at least one of the following: an identifier defining the business in a different data life cycle stage and an identifier defining the business in a different communication protocol; and the identifier defining a service includes at least one of the following: an identifier defining the service in a different data life cycle stage and an identifier defining the service in a different communication protocol.

According to a second aspect, a data management method is provided. The method is applied to a vehicle. The vehicle includes a processing module, a privacy proxy module, and a middleware module. The processing module is configured to process a business. The privacy proxy module is configured to implement a privacy control function. The middleware module is configured to provide, for a business, an interface that is based on a service-oriented architecture SOA. The method includes: The processing module sends first request information to the middleware module, where the first request information is used to request to invoke first data for a first business, the first request information includes a first identifier, the first identifier includes at least one of the following: a client identifier of the first business, a process identifier of the first business, and a service identifier of a data provider of the first data. The client identifier is an identifier indicating a data invoker. The service identifier is an identifier indicating a data provider. The process identifier is an identifier of a business that is run as a process. The middleware module sends first query information to the privacy proxy module. The first query information is used to query whether invocation of the first data for the first business is approved. The first query information includes the first identifier. The privacy proxy module sends first response information to the middleware module. The first response information indicates whether invocation of the first data for the first business is approved. The first response information is determined based on the first identifier and a privacy policy file. The privacy policy file includes at least one of the following: first configuration information indicating an access permission between a business and a service or an access permission between businesses, and second configuration information indicating an access permission of a business.

Privacy management and control of data can be implemented based on the middleware module provided by a system platform. For example, during data collection, data sharing, and data transmission to the outside of the vehicle, when a business invokes data, the business collectively invokes the data through a middleware module based on an SOA principle of the vehicle. The middleware module determines, by using a privacy proxy module, whether the invocation is within a scope allowed by a privacy policy file. A privacy control node is added based on the platform mechanism of the system, to manage and control a business executed by the middleware module and implement privacy data collection control method that cannot be bypassed by an upper-layer business. This improves efficiency and security of vehicle privacy management and control.

With reference to the second aspect, in some implementations of the second aspect, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data.

With reference to the second aspect, in some implementations of the second aspect, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data.

With reference to the second aspect, in some implementations of the second aspect, the first business invokes the first data in a manner of data collection. The first data is data of a first service. The first identifier includes the client identifier of the first business and a service identifier of the first service. That the privacy proxy module sends first response information to the middleware module includes: When the client identifier of the first business and the service identifier of the first service belong to the first association relationship indicated by the first configuration information, the privacy proxy module sends the first response information to the middleware module. The first response information indicates that invocation of the first data for the first business is approved.

With reference to the second aspect, in some implementations of the second aspect, the first business invokes the first data in a manner of data sharing, the first data is data of a second business, a type of data sharing is publish/subscribe, and the first identifier includes the client identifier of the first business and a service identifier of the second business. The method further includes: that the privacy proxy module sends first response information to the middleware module includes: When the client identifier of the first business and a service identifier of a second service belong to the second association relationship indicated by the first configuration information, the privacy proxy module sends the first response information to the middleware module. The first response information indicates that invocation of the first data for the first business is approved.

With reference to the second aspect, in some implementations of the second aspect, the first business invokes the first data in any one of the following manners: data collection and data transmission to the outside of the vehicle. The first identifier includes the client identifier of the first business or the process identifier of the first business. That the privacy proxy module sends first response information to the middleware module includes: When the first identifier belongs to an access scope indicated by the second configuration information, the privacy proxy module sends the first response information to the middleware module. The first response information indicates that invocation of the first data for the first business is approved.

With reference to the second aspect, in some implementations of the second aspect, the first business invokes the first data in a manner of data sharing. The first data is data of a second business. A type of data sharing is broadcast. The first identifier includes a service identifier of the second business. That the privacy proxy module sends first response information to the middleware module includes: When the service identifier of the second business belongs to an access scope indicated by the second configuration information, the privacy proxy module sends the first response information to the middleware module. The first response information indicates that invocation of the first data for the first business is approved.

According to a third aspect, a data management method is provided. The method includes: A data storage management module receives storage request information of a first business from a processing module. The storage request information includes to-be-stored first data, a data identifier of the first data, and storage rating information. The storage rating information indicates a privacy level corresponding to the data identifier of the first data. The processing module is disposed in a vehicle. The data storage management module is configured to implement a data storage management function. The processing module is configured to process a business. The data storage management module stores the first data. The data storage management module deletes the first data when storage duration of the first data reaches a retention period. The retention period is determined based on the storage rating information.

In this application, the retention period of the data is associated with the storage rating information, and performs management and control. When performing storage management on the data in the vehicle, the data storage management module may delete data based on a retention period corresponding to storage rating information. In this way, privacy data is collectively managed and periodically deleted. This improves security and efficiency of vehicle data storage management.

With reference to the third aspect, in some implementations of the third aspect, the data storage management module sends second query information to a privacy proxy module. The second query information is used to query the retention period of the first data. The second query information includes the data identifier and the storage rating information of the first data. The privacy proxy module is configured to implement a privacy control function. The privacy proxy module sends first indication information to the data storage management module. The first indication information indicates the retention period of the first data.

The privacy proxy module associates the retention period of the data with the storage rating information, and performs management and control. When performing storage management on the data in the vehicle, the data storage management module may obtain information related to the retention period by communicating with the privacy proxy module, so that data is deleted based on the retention period. In this way, privacy data is collectively managed and periodically deleted. This improves security and efficiency of vehicle data storage management.

With reference to the third aspect, in some implementations of the third aspect, the data storage management module sends second query information to a privacy proxy module. The second query information includes the data identifier and the storage rating information of the first data. The privacy proxy module is configured to implement a privacy control function. The privacy proxy module determines the retention period based on the storage rating information. When the storage duration of the first data reaches the retention period, the privacy proxy module sends deletion indication information to the data storage management module. The deletion indication information indicates to delete the first data.

With reference to the third aspect, in some implementations of the third aspect, the data storage management module is disposed in the vehicle.

According to a fourth aspect, an in-vehicle device is provided. The in-vehicle device includes a privacy center module, a privacy proxy module, and a middleware module. The privacy center module is configured to: obtain a privacy configuration file; obtain a privacy policy file based on the privacy configuration file, where the privacy policy file includes at least one of the following: first configuration information indicating an access permission between a business and a service or an access permission between businesses, and second configuration information indicating an access permission of a business; send the privacy policy file to the privacy proxy module, where the privacy policy file is used for access control of the middleware module. The middleware module is configured to provide, for a business, an interface that is based on a service-oriented architecture SOA.

With reference to the fourth aspect, in some possible implementations of the fourth aspect, the privacy center module is specifically configured to: present a privacy configuration option to a user in a display interface based on the privacy configuration file, where the privacy configuration option is used by the user to select at least one of the following: whether to authorize a business to invoke data of at least one service, and whether to authorize the business to invoke data of at least one other business; obtain a result of selection performed by the user on the privacy configuration option; and obtain the privacy policy file based on the selection result.

With reference to the fourth aspect, in some possible implementations of the fourth aspect, the privacy configuration file includes privacy rating information. The privacy rating information indicates privacy levels of data corresponding to different service identifiers. The service identifier is an identifier indicating a data provider.

With reference to the fourth aspect, in some possible implementations of the fourth aspect, quantization values are used in the privacy rating information to distinguish between the privacy levels of data.

With reference to the fourth aspect, in some possible implementations of the fourth aspect, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data, where the client identifier is an identifier indicating a data invoker, and the service identifier is an identifier indicating a data provider.

With reference to the fourth aspect, in some possible implementations of the fourth aspect, the second configuration information includes at least one of the following: a client identifier of a business that is allowed to collect data; a client identifier or a process identifier of a business that is allowed to transmit data to the outside of a vehicle; a service identifier of a service that is allowed to provide data; and a service identifier of a business that is allowed to provide shared data, where the client identifier is an identifier indicating a data invoker, the service identifier is an identifier indicating a data provider, and the process identifier is an identifier of a business that is run as a process.

With reference to the fourth aspect, in some possible implementations of the fourth aspect, the privacy configuration file includes at least one of the following: an identifier defining a business; an identifier defining a service; an identifier defining a different data life cycle stage; information indicating an association relationship between a business and a service; and information indicating an association relationship between businesses.

With reference to the fourth aspect, in some possible implementations of the fourth aspect, the identifier defining a business includes at least one of the following: an identifier defining the business in a different data life cycle stage and an identifier defining the business in a different communication protocol; and the identifier defining a service includes at least one of the following: an identifier defining the service in a different data life cycle stage and an identifier defining the service in a different communication protocol.

According to a fifth aspect, an in-vehicle device is provided. The in-vehicle device includes a processing module, a privacy proxy module, and a middleware module. The processing module is configured to send first request information to the middleware module. The first request information is used to request to invoke first data for a first business. The first request information includes a first identifier. The first identifier includes at least one of the following: a client identifier of the first business, a process identifier of the first business, and a service identifier of a provider of the first data. The client identifier is an identifier indicating a data invoker. The service identifier is an identifier indicating a data provider. The process identifier is an identifier used when a business is run as a process. The middleware module is configured to send first query information to the privacy proxy module. The first query information is used to query whether invocation of the first data for the first business is approved. The first query information includes the first identifier. The middleware module is configured to provide, for a business in the in-vehicle device, an interface that is based on a service-oriented architecture SOA. The privacy proxy module is configured to send first response information to the middleware module. The first response information indicates whether invocation of the first data for the first business is approved. The first response information is determined based on the first identifier and a privacy policy file. The privacy policy file includes at least one of the following: first configuration information indicating an access permission between a business and a service or an access permission between businesses, and second configuration information indicating an access permission of a business.

With reference to the fifth aspect, in some possible implementations of the fifth aspect, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data.

With reference to the fifth aspect, in some possible implementations of the fifth aspect, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data.

With reference to the fifth aspect, in some possible implementations of the fifth aspect, the first business invokes the first data in a manner of data collection. The first data is data of a first service. The first identifier includes the client identifier of the first business and a service identifier of the first service. The privacy proxy module is specifically configured to: when the client identifier of the first business and the service identifier of the first service belong to the first association relationship indicated by the first configuration information, send the first response information to the middleware module. The first response information indicates that invocation of the first data for the first business is approved.

With reference to the fifth aspect, in some possible implementations of the fifth aspect, the first business invokes the first data in a manner of data sharing. The first data is data of a second business. A type of data sharing is publish/subscribe. The first identifier includes the client identifier of the first business and a service identifier of the second business. The privacy proxy module is specifically configured to: when the client identifier of the first business and the service identifier of a second service belong to the second association relationship indicated by the first configuration information, send the first response information to the middleware module. The first response information indicates that invocation of the first data for the first business is approved.

With reference to the fifth aspect, in some possible implementations of the fifth aspect, the first business invokes the first data in any one of the following manners: data collection and data transmission to the outside of the vehicle. The first identifier includes the client identifier of the first business or the process identifier of the first business. The privacy proxy module is specifically configured to: when the first identifier belongs to an access scope indicated by the second configuration information, send the first response information to the middleware module. The first response information indicates that invocation of the first data for the first business is approved.

With reference to the fifth aspect, in some possible implementations of the fifth aspect, the first business invokes the first data in a manner of data sharing. The first data is data of a second business. A type of data sharing is broadcast. The first identifier includes a service identifier of the second business. The privacy proxy module is specifically configured to: when the service identifier of the second business belongs to an access scope indicated by the second configuration information, send the first response information to the middleware module. The first response information indicates that invocation of the first data for the first business is approved.

According to a sixth aspect, a data management device is provided, including: a data storage management module, where the data storage management module is configured to receive storage request information of a first business from a processing module. The storage request information includes to-be-stored first data, a data identifier of the first data, and storage rating information. The storage rating information indicates a privacy level corresponding to the data identifier of the first data. The processing module is disposed in a vehicle. The data storage management module is configured to implement a data storage management function. The processing module is configured to process a business. The data storage management module is further configured to store the first data; and when storage duration of the first data reaches a retention period, delete the first data. The retention period is determined based on the storage rating information.

With reference to the sixth aspect, in some possible implementations of the sixth aspect, the device further includes a privacy proxy module. The data storage management module is further configured to send second query information to the privacy proxy module. The second query information is used to query the retention period of the first data. The second query information includes the data identifier and the storage rating information of the first data. The privacy proxy module is configured to send first indication information to the data storage management module. The first indication information indicates the retention period of the first data.

With reference to the sixth aspect, in some possible implementations of the sixth aspect, the device further includes a privacy proxy module. The data storage management module is further configured to send second query information to the privacy proxy module. The second query information includes the data identifier and the storage rating information of the first data. The privacy proxy module is configured to: determine the retention period based on the storage rating information; and when the storage duration of the first data reaches the retention period, send deletion indication information to the data storage management module. The deletion indication information indicates to delete the first data.

With reference to the sixth aspect, in some possible implementations of the sixth aspect, the device is the vehicle.

According to a seventh aspect, an in-vehicle device is provided, where the device includes a processor. The processor is configured to invoke a computer program from a memory. When the computer program is executed, the processor is configured to perform the method in any one of the first aspect or the possible implementations of the first aspect, or configured to perform the method in any one of the second aspect or the possible implementations of the second aspect.

According to an eighth aspect, a data management device is provided. The device includes a processor. The processor is configured to invoke a computer program from a memory. When the computer program is executed, the processor is configured to perform the method in any one of the third aspect or the possible implementations of the third aspect.

According to a ninth aspect, a computer-readable storage medium is provided. The computer-readable storage medium configured to store a computer program, where the computer program includes code used to perform the method in any one of the first aspect or the possible implementations of the first aspect, or include code used to perform the method in the second aspect or any possible implementation of the second aspect, or include code used to perform the method in the third aspect or any possible implementation of the third aspect.

According to a tenth aspect, a computer program product including a computer program is provided. The computer program product includes code used to perform the method in any one of the first aspect or the possible implementations of the first aspect, or include code used to perform the method in any one of the second aspect or the possible implementations of the second aspect, or include code used to perform the method in any one of the third aspect or the possible implementations of the third aspect.

According to an eleventh aspect, a vehicle is provided. The vehicle includes an in-vehicle device in any one of the fourth aspect or the possible implementations of the fourth aspect, the in-vehicle device in any one of the fifth aspect or the possible implementations of the fifth aspect, the device in any one of the sixth aspect or the possible implementations of the sixth aspect, or the in-vehicle device in the seventh aspect, or the data management device in the eighth aspect.

DESCRIPTION OF EMBODIMENTS

Figure 1:
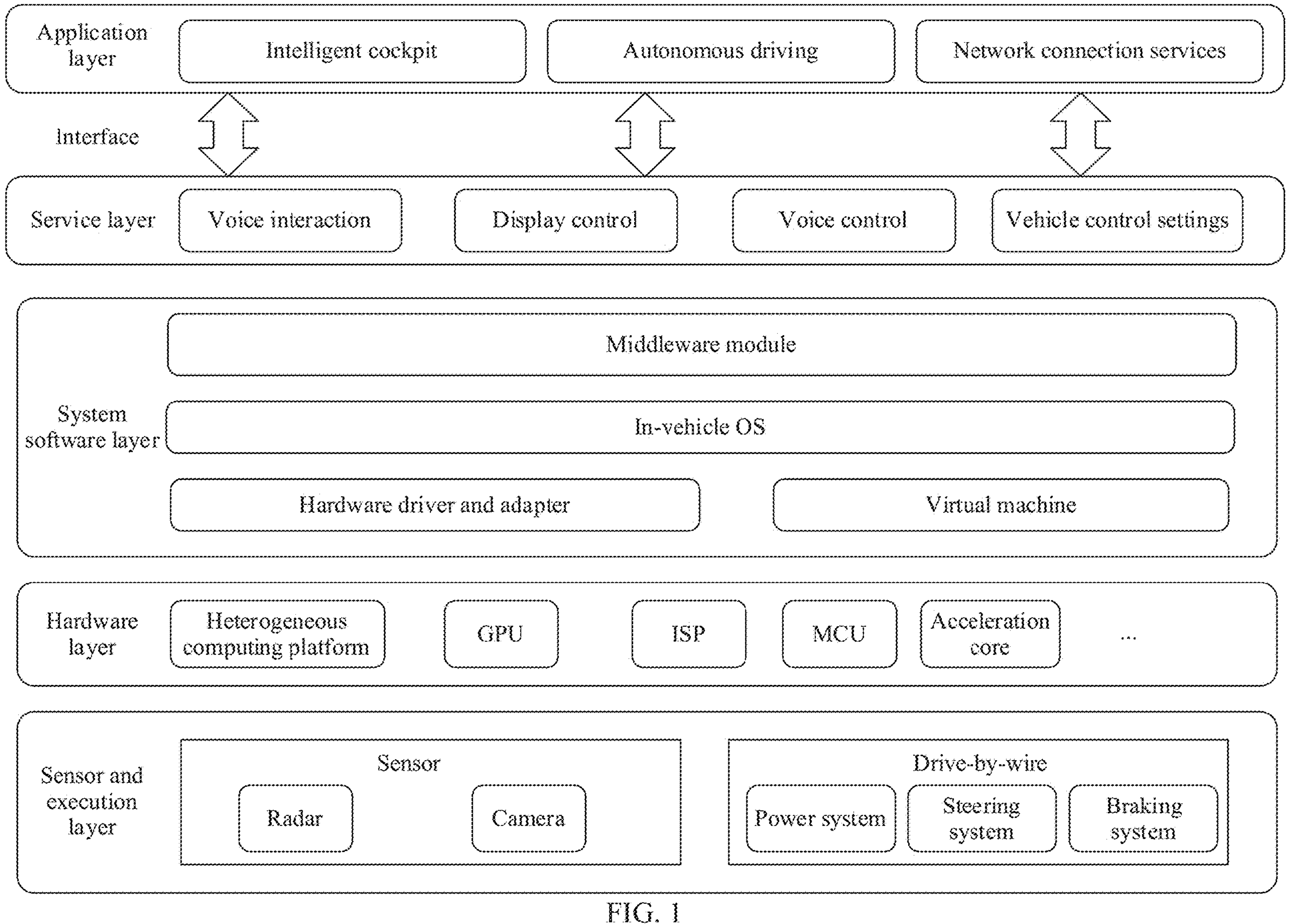
FIG. 1 is a schematic diagram of an SOA applied to a vehicle according to an embodiment of this application.

The following describes technical solutions in this application with reference to accompanying drawings.

Embodiments of this application provide a data management method and apparatus, and a complete set of data cycle management solutions covering human-machine interaction, data collection, data usage for business processing, and data retention and destruction are provided for vehicle privacy protection.

For ease of understanding, the following describes definitions of several terms in embodiments of this application.

Business: refers to an upper-layer function perceptible to a user in a system, for example, a business of account login through face recognition, a reverse parking video business, a remote diagnosis business, a pet mode business, and a vehicle-level upgrade business. The reverse parking video business may refer to collecting a real-time video of an ambient environment of a vehicle during reverse parking. The remote diagnosis business refers to periodic reporting of fault data during vehicle operation. The pet mode business may refer to a business in which a vehicle feeds back interior status information of the vehicle to a vehicle owner in real time when the vehicle owner leaves a pet in the vehicle. The vehicle-level upgrade business means that a vehicle periodically reports status information of each component in the vehicle to support software upgrade of the vehicle. Data obtained in execution processes of the foregoing businesses may be privacy data. The foregoing privacy data includes, but is not limited to, video data obtained from a reversing parking video, vehicle status data, and the like.

Program: refers to a bottom-layer function that is not directly exposed to a user in a system, for example, a service program that is being executed.

Service: refers to an internal service that is of a system and that is not directly exposed to a client. A basic capability of the system can be provided as a service for scheduling by a business. In some examples, services may refer to different functional units in an application. For example, the service may be a functional unit for recording video data of an in-vehicle camera, a functional unit for recording status information of a component in the vehicle, or a functional unit for recording audio data of a vehicle microphone. The status information may include status information of a thermal management system (TMS), vehicle driving status information of a vehicle domain controller (VDC), environment awareness information of radar, and the like.

A client identifier (client ID) is an identifier indicates a data invoking party. The data invoking party may also be referred to as a service invoking party, and generally refers to an identifier of a business that uses data. The client identifier may be understood as an identifier allocated by a system protocol stack to an upper-layer business, to distinguish a business that invokes data.

A service identifier (service ID) is an identifier indicates an identifier of a data provider. The data provider may also be referred to as a service provider, and usually refers to a program that generates data or provides data. The service identifier may be understood as a service identifier used by the system protocol stack to identify a bottom-layer program. From the perspective of privacy protection, when the bottom-layer program is associated with personal privacy data, the service identifier may be considered as an identifier assigned to the data provider.

In addition, it should be understood that a service identifier is assigned to a program. For example, if a service requires a vehicle identification number (VIN), an assigned service identifier 001 is used to identify a program providing the VIN rather than the VIN.

Process identifier: When a business that uses privacy data runs directly as a process in a machine, a business can be identified by a process identifier.

Data identifier: used to identify different data. It can be used to identify saved data items or files during data storage. For example, after a business obtains data, a data identifier may be allocated to the data. After a reverse parking video business obtains video data recorded by an external camera, a data identifier may be allocated to the video data.

In this application, a service-oriented architecture (SOA) is used to implement data management and transmission in a vehicle. The SOA is a loosely coupled service architecture. Services communicate with each other through simple well-defined interfaces, without bottom-layer programming interfaces and communication models. The interfaces are defined in a neutral manner and can be independent of a hardware platform, an operating system, and a programming language that are used for service implementation. This allows services built in various systems to interact in a unified and universal manner.

FIG. 1 is a schematic diagram of an SOA applied to a vehicle according to an embodiment of this application. As shown in FIG. 1, the SOA includes an application layer, a service layer, a system software layer, a hardware layer, and a sensor and execution layer.

The application layer is used to run a business, and includes upper-layer functions perceptible to a user in a system. Vehicle-level services, applications, and experiences can be defined and enhanced through combination by the application layer. The application layer includes but is not limited to businesses in fields such as intelligent cockpit, autonomous driving, and network connection services.

The service layer is used to implement data convergence or control logic. As the smallest unit of a service and a single execution entity, the service layer provides, through the interface (for example, an application programming interface (API)), a basic service that can be orchestrated as required for an application.

The system software layer includes a middleware module, an in-vehicle operating system (OS), a hardware driver, an adapter, a virtual machine, and the like.

The middleware module may be a function module configured to provide an interface that is based on the SOA. The middleware module is mainly configured to implement the following functions. On the one hand, a bottom-layer implementation may be encapsulated, and system bottom-layer implementations and differences that are useless to an upper-layer business are shielded. On the other hand, information about all services can be aggregated to provide a centralized entry for service subscription and request for an upper-layer business. In other words, the middleware module can be used as an anchor to add a layer for management and control that cannot be bypassed by an upper-layer business.

For example, for internal vehicle business processing, functions of the middleware module include providing a centralized service invoking entry for upper-layer businesses of the vehicle. When a business initiates a service request, and the request is integrated to the middleware module, the middleware module performs message conversion and content identification and redirect the request to a service. Then a service entity responds.

For example, for vehicle communication with the outside, functions of the middleware module include: performing centralized transmission channel management and control on vehicle data transmission to the outside of the vehicle; and when business data needs to be transferred to the cloud, transferring the data to the middleware module by using an in-vehicle protocol. The middleware module performs message identification, protocol conversion, and data transmission to the cloud server.

The hardware layer includes various processors and hardware facilities, for example, a heterogeneous computing platform, a graphics processing unit (GPU), a central processing unit (CPU), an image sensor processing (ISP) module, and a microcontroller unit (MCU), acceleration core, and the like.

The sensor and execution layer includes various sensors and drive-by-wire systems. For example, the sensor includes but is not limited to a radar, a camera. The drive-by-wire system includes but is not limited to a power system, steering system, and braking system.

The SOA may encapsulate a conventional controller area network (CAN) signal into a form of a service to expose a business. Ethernet protocols can be used for service-oriented data, which ensures reliability and provides convenient invoking interfaces. Data streams are not sent through conventional CAN broadcast. Instead, data streams are pushed based on subscription. In this way, on-demand acquisition of system resources is implemented.

The SOA can be used to implement the following platform-based functions.

(i) Platform-based resource management: When platform-based management is performed, personal data sources are all encapsulated and can be collectively invoked by a business. For example, when a business needs a VIN, the VIN is not obtained through a diagnostic trouble code. Instead, the business sends a request to a service that manages VINs collectively. When request succeeds, the business can obtain the VIN in a response message.

(ii) Platform-based capability: In the SOA, communication protocols of components can be collectively managed and controlled to form platform-based middleware. An upper-layer business does not integrate a protocol stack independently. Instead, the upper-layer business accesses the centralized middleware to implement a communication function. For example, a network standard protocol (for example, Hypertext Transfer Protocol HTTP) is used as a public middleware module. A business accesses the middleware module and carries, in an access request, a business data payload that needs to be transmitted in a message. The middleware module encapsulates the business data payload based on the standard protocol definition and sends the data.

Platform-based resource management in (i) may refer to platform-based management on a data plane, and platform-based capability in (ii) may refer to platform-based capability on a control plane.

(iii) Platform-based data storage: With a centralized scheduling capability of a data storage management module, a cloud can implement platform-based storage. Before data is flushed to a disk and a server, the data needs to pass through a centralized control node. Only a business with a write permission can be stored. In turn, when data is read from the data storage management module, the data also passes through a trustworthiness certification node. Disk flushing refers to writing data to a storage medium, for example, a disk.

(iv) Platform-based extension for validity period: Based on the platform-based storage, when flushed data is tagged, retention period management can be performed based on a tag. For example, if a data retention period of a business is fixed at 90 days, data transmitted by the business to a data storage and management module every day includes a process identifier, a client identifier, or a data identifier. The centralized storage and management module cyclically determines, on a daily basis, data that needs to be cleared on a current day, and deletes data when determining, based on a tag, that a retention period expires.

It should be understood that FIG. 1 is merely used as an example to describe the SOA, and an SOA obtained by performing proper transformation, addition, or deletion based on that in FIG. 1 is also applicable to the method in embodiments of this application.

An embodiment of this application provides a vehicle data management solution. The data management solution provides a privacy management architecture based on an SOA. The privacy management architecture can perform customized centralized management on the entire data life cycle, including data collection, sharing, transmission, storage, and the like. The following describes a privacy management architecture in embodiments of this application with reference to accompanying drawings.

Figure 2:
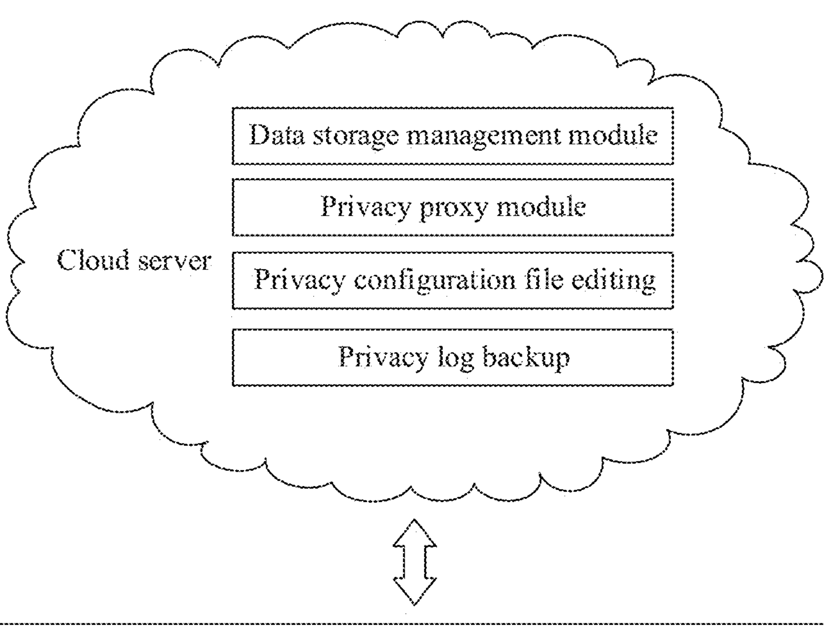
FIG. 2 is a schematic diagram of a privacy management architecture applied to a vehicle according to an embodiment of this application.
Figure 2:
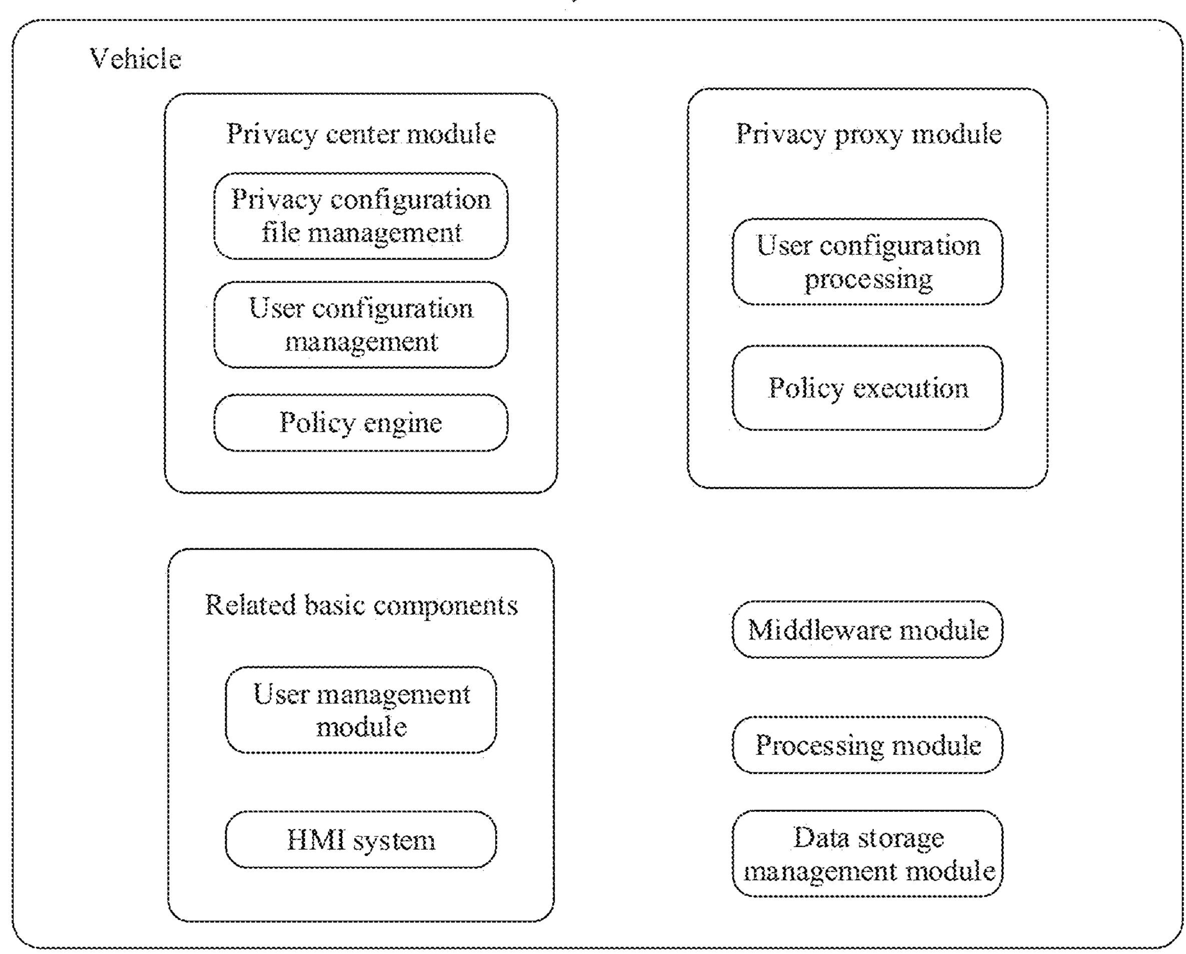

FIG. 2 is a schematic diagram of a privacy management architecture applied to a vehicle according to an embodiment of this application. As shown in FIG. 2, the privacy management architecture includes a vehicle and a cloud server, which may also be referred to as a vehicle end and a cloud end respectively. The cloud server may include one or more servers. A structure and a type of the cloud server are not limited in this embodiment of this application. For example, the cloud server may use a central system, or may use a distributed system.

Optionally, the cloud server may be a cloud server of an original equipment manufacturer (OEM), or may be a server of a third-party service provider (for example, a service provider providing a voice entertainment service).

As shown in FIG. 2, for example, functions of the cloud server include but are not limited to the following: editing of a privacy configuration file in a vehicle development stage, related control functions in a vehicle use stage, and backing up privacy logs.

Still refer to FIG. 2. The vehicle includes a processing module, a middleware module, a privacy center module, and a privacy proxy module. The vehicle includes but is not limited to an electric vehicle, an intelligent vehicle, and the like.

It should be understood that the foregoing modules are divided based on functions. In physical implementation, the foregoing modules may be disposed on different nodes, or may be disposed on a same node. Each module may be disposed on a single node, or may be disposed on a plurality of nodes by using a distributed technology.

The processing module may be a function module configured to process a business or an application in the vehicle. The processing module may be disposed on any node in the vehicle. For example, the processing module may be disposed in a domain controller or an ECU in the vehicle.

For a definition of the middleware module, refer to the descriptions in FIG. 1. Details are not described herein again. Optionally, the middleware module may be disposed at a node close to a business, for example, may be disposed at a same node as the processing module.

Still refer to FIG. 2. The vehicle may include the privacy center module and the privacy proxy module. As an example, the privacy center module may be disposed on a node having a higher processing capacity in the vehicle. Functions of the privacy center module include but are not limited to the following functions.

(1) Privacy configuration file management function is used to edit a privacy configuration file connected to the cloud end, that is, accept, perceive, and process a privacy-related configuration file delivered by the cloud end. In some examples, editing of the privacy configuration file may include, but is not limited to, at least one of the following: privacy file configuration; privacy preference configuration; personally identifiable information (PII) storage configuration; and data classification configuration.

(2) User configuration management function is used to connect to a user, where the user includes a vehicle owner or another vehicle user. For example, the privacy center module may interact with the user through a human machine interface (HMI), and complete receiving and processing of a privacy configuration by using an associated user management module based on a natural person.

(3) Policy engine is configured to manage a privacy configuration file and a user configuration, and further generate a privacy policy that can be processed by an internal system on the vehicle end. The privacy policy may be delivered to the privacy proxy module for execution.

The privacy proxy module may be configured to receive control instructions from the privacy center module and implement a privacy control function by using a corresponding business. Functions of the privacy proxy module include but are not limited to the following functions.

(1) User configuration processing is used to store privacy configuration information.

(2) Policy execution is used to execute a privacy policy delivered by the privacy center or perform real-time privacy operation based on a local user configuration.

Optionally, embodiments of this application may usually include one privacy center module and one or more privacy proxy modules.

Optionally, specific deployment locations of the privacy center module and the privacy proxy module are not limited in embodiments of this application. The privacy center module and the privacy proxy module may be deployed at different nodes in the vehicle. Even some privacy proxy modules can be deployed on the cloud server.

In some examples, the privacy center module may usually be deployed on a node in the vehicle, for example, may be disposed on a node with high computing power, for example, a cockpit domain controller (CDC) or a vehicle domain controller (VDC), or may be disposed in another domain controller. In some examples, different function modules in the privacy center module may also be distributed at different nodes. For example, a user configuration management module in the privacy center module may be disposed at the CDC, to facilitate interaction with the user, and other function modules in the privacy center module may be disposed at the VDC. However, for ease of management, the privacy proxy module is usually disposed in a position close to a business. For example, the privacy proxy module may be disposed on a node that processes the business. In some examples, the privacy proxy module may be disposed in an in-vehicle operating system (OS), to manage and control an upload business in combination with the middleware module.

In some examples, privacy proxy modules may be disposed in various nodes in the vehicle. For example, privacy proxy modules may be disposed in domain controllers responsible for different functions or in different ECUs. In some examples, the privacy proxy module may be further disposed on the cloud end. For example, privacy data of the user may be uploaded to a data storage management module on the cloud end. Therefore, the privacy proxy module may also be disposed near a data storage management module, to perform privacy management related to data storage.

It should be understood that in a vehicle design, usually, there may be a plurality of nodes in the vehicle, and each node is responsible for different management and control functions. These nodes may include, but are not limited to, a domain control unit (DCU), an electronic control unit (ECU), and the like in the vehicle. The ECU refers to a control unit that controls a driving status of the vehicle and other functions with various sensors and data collection and exchange of a bus. For example, the ECU may include an engine management system (EMS), an automatic transmission control unit (TCU), a battery management system (BMS), and the like. Each ECU is provided with units such as a microcontroller, a memory, an input/output interface, and the like. Different ECUs may have different processing capabilities, may be made by different manufacturers, and are used to manage different functions in the vehicle. With development of the intelligent vehicle field, vehicle control will become more centralized in the future. In this case, several domain controllers may be disposed in a vehicle, while functions of the conventional ECU are simplified, of which software and processing functions are degraded with only functions at an execution layer retained. The ECU or a sensor may transmit data to the domain controller, and the domain controller completes complex calculation and most control functions. The solutions in embodiments of this application are applicable to a plurality of system architectures in an intelligent vehicle evolution process.

Optionally, the privacy center module and the privacy proxy module may be disposed in a same node, or may be disposed in different nodes. For example, the privacy center module and the privacy proxy module may be disposed in a same domain controller, or may be disposed in different domain controllers.

Optionally, a processing module, a middleware module, and a privacy proxy module may be disposed at a plurality of nodes in the vehicle. The processing module at each node is configured to process a business related to the node, and implement data privacy management by using the middleware module and the privacy proxy module of the node. Optionally, when the processing module, the middleware module, and the privacy proxy module are disposed on different nodes, communication interaction may also be performed, to implement data privacy management.

In addition, as shown in FIG. 2, the vehicle may further include some basic components required by the intelligent vehicle. For example, a human machine interface (HMI) system and a user management module. The HMI system is configured to provide a user interaction capability. For example, the HMI system can provide a screen to output content for the user to read, and provide a button option for the user to input a configuration at will. The user management module is configured to provide a user identity authentication capability and a user identity association capability, so that a user-centric privacy protection solution can be established.

The system architecture of the vehicle in this embodiment of this application may use a conventional in-vehicle domain controller architecture including a central gateway, or may use a ring network architecture, or may use another vehicle architecture. The in-vehicle domain controller architecture including a central gateway is also referred to as a star architecture. A plurality of domains are disposed in the architecture, and each domain includes a master domain controller, for example, a cockpit domain controller (CDC), a multi domain controller (MDC), a vehicle domain controller (VDC), and the like. One or more ECUs can be mounted to each domain controller.

However, in the ring network architecture, a plurality of vehicle identification units (VIUs) are disposed. Each domain controller may be connected to a VIU, and a plurality of ECUs are mounted to each VIU. The VIU may be understood as an enhanced gateway. For the ECU, existence of a domain is of less significance because the ECU is not directly connected to the domain controller, but connected to the domain controller through the VIU.

Figure 3:
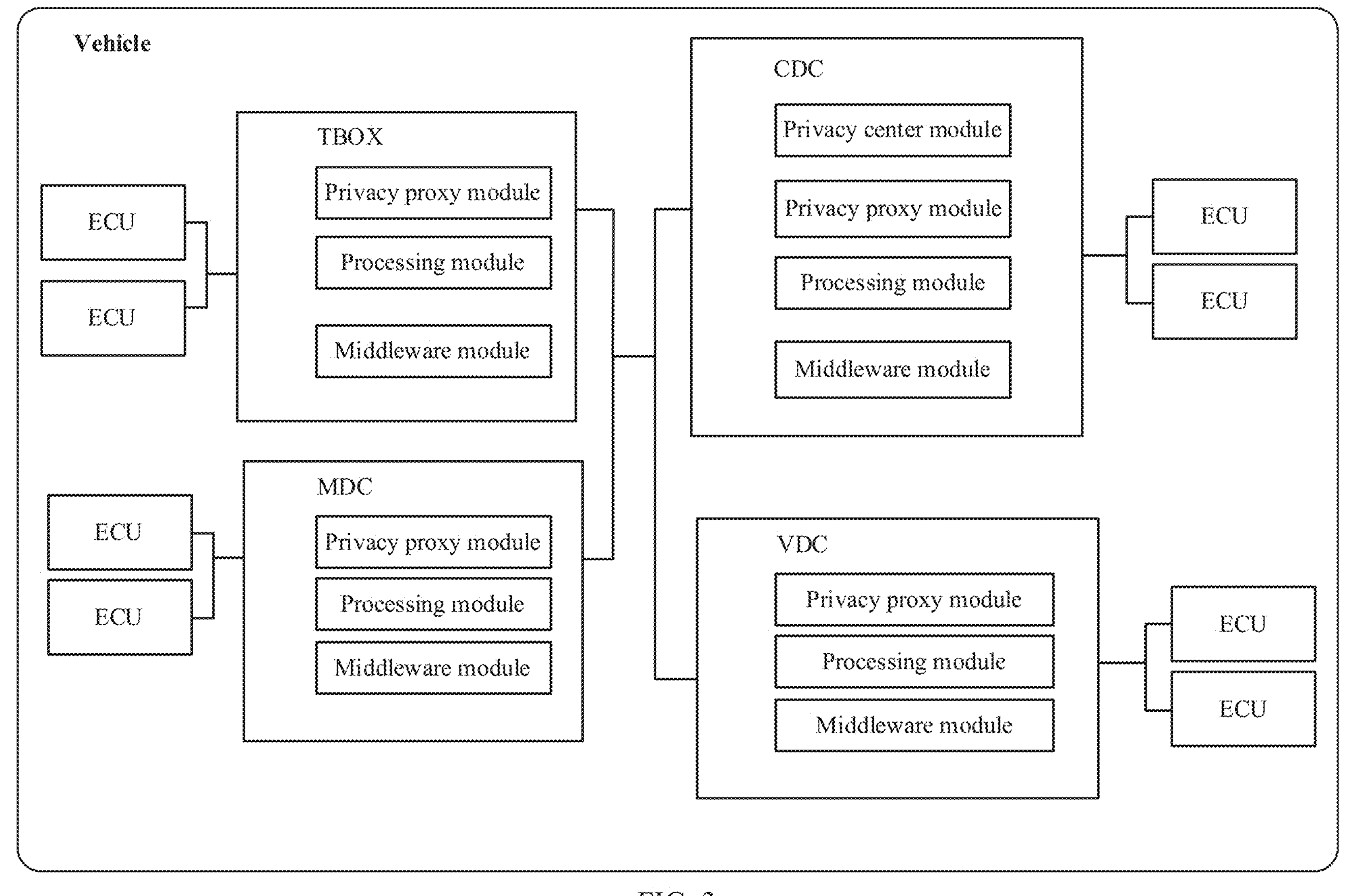
FIG. 3 is a schematic diagram of a vehicle with an in-vehicle domain control architecture including a central gateway according to an embodiment of this application.
Figure 4:
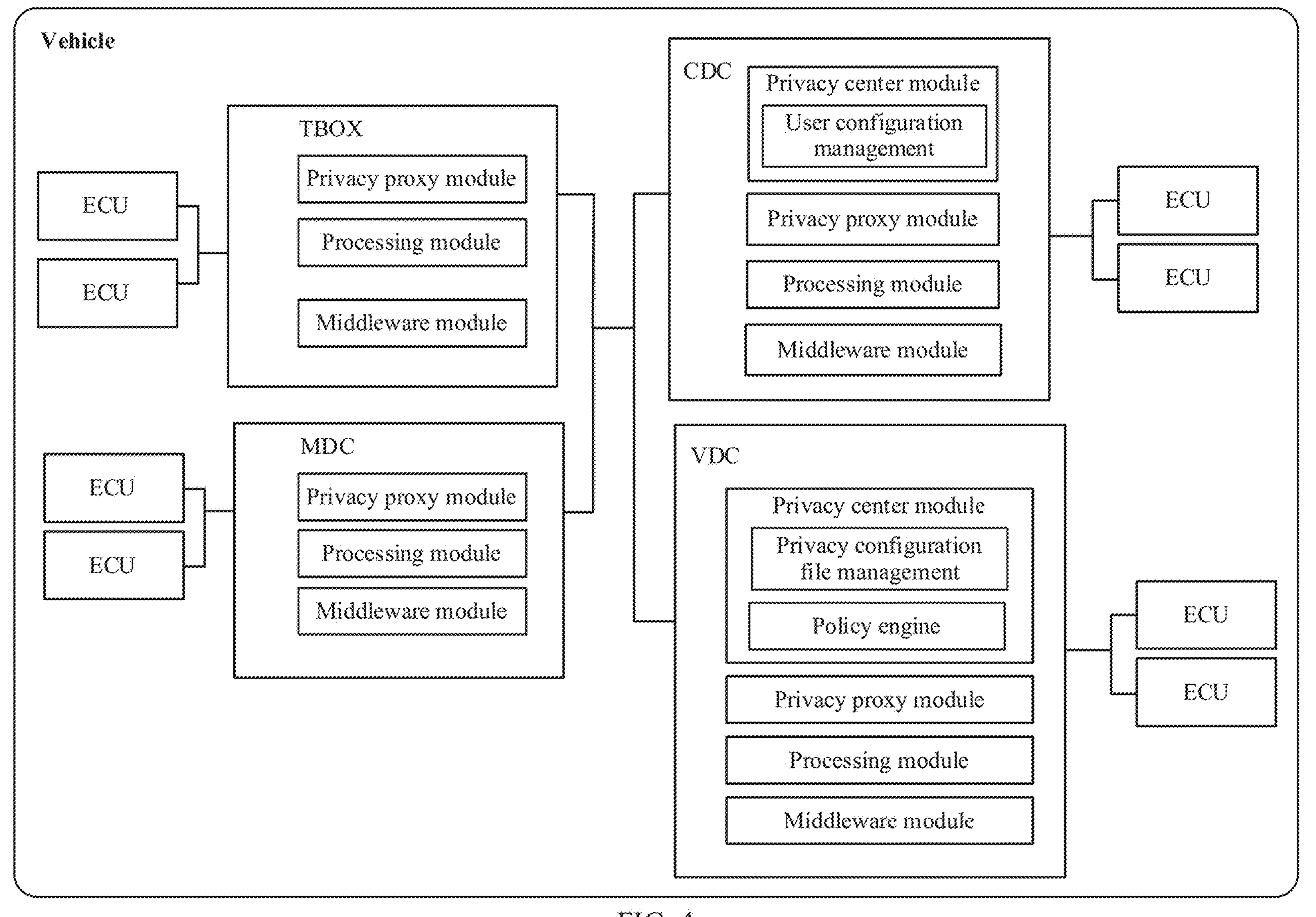
FIG. 4 is a schematic diagram of a vehicle with an in-vehicle domain control architecture including a central gateway according to another embodiment of this application.
Figure 5:
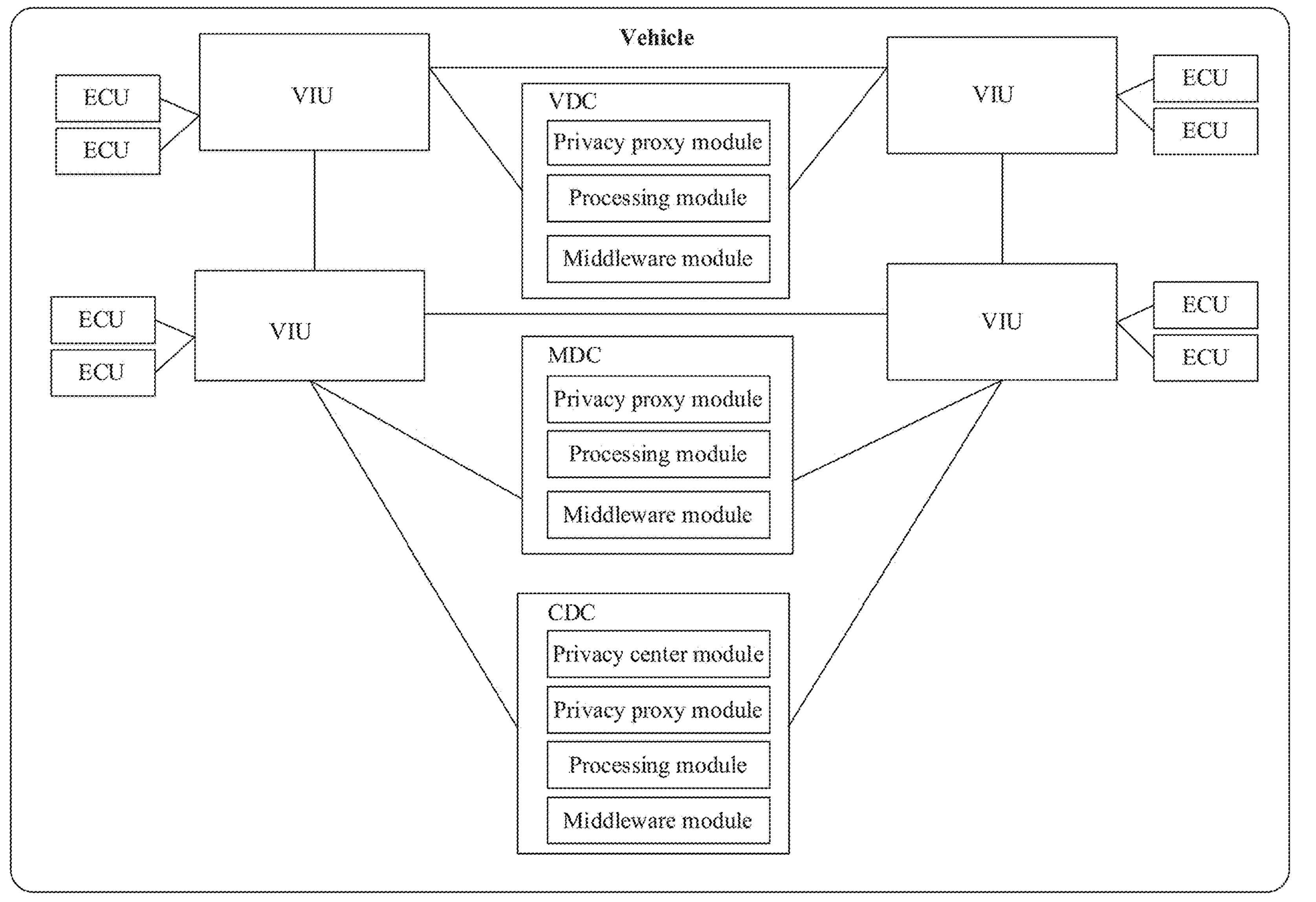
FIG. 5 is a schematic diagram of a vehicle including a ring network architecture according to an embodiment of this application.

The following further describes, with reference to FIG. 3 to FIG. 5, structures of different vehicle architectures to which the solutions in embodiments of this application are applied.

FIG. 3 is a schematic diagram of an in-vehicle domain control architecture including a central gateway in a vehicle according to an embodiment of this application. As shown in FIG. 3, the architecture may include domain controllers such as a CDC, an MDC, a VDC, and a telematics box (TBOX). A privacy center module may be disposed in the CDC. A privacy proxy module, a processing module, and a middleware module may be disposed in each domain controller. The privacy proxy module may be configured to implement a privacy control function of a business of a domain controller in which the privacy proxy module is located.

As examples, the foregoing domain controllers are defined as follows.

CDC is a domain controller for human machine interaction and audio and video entertainment functions on a vehicle side.

MDC is a domain controller configured to carry an assisted driving or autonomous driving function, and is also referred to as an automated driving control unit (ADCU).

VDC is a domain controller for chassis and power control.

TBOX provides basic communication capabilities for the internet of vehicles.

It should be understood that the foregoing domain controllers are merely described as examples. The solution in this embodiment of this application may be further applied to another type of domain controller or computing node. The names of the domain controllers may alternatively be other names.

Optionally, an ECU with high computing power may also be configured to process a business. Therefore, a privacy proxy module, a processing module, and a middleware module may also be disposed in the ECU.

In some examples, a privacy center module may also be distributed on a plurality of domain controllers. For example, FIG. 4 is a schematic diagram of an in-vehicle domain control architecture including a central gateway in a vehicle according to another embodiment of this application. As shown in FIG. 4, a user configuration management module in a privacy center module may be disposed in a CDC, to facilitate interaction with a user, and a privacy configuration file management module and a policy engine in the privacy center module may be disposed in a VDC.

FIG. 5 is a schematic diagram of a vehicle including a ring network architecture according to an embodiment of this application. As shown in FIG. 5, a privacy center module may be disposed in a CDC, and a privacy proxy module, a processing module, and a middleware module may be disposed in a CDC, a VDC, or an MDC.

Optionally, the privacy center module may be disposed on another node, or the privacy center module may be disposed on a plurality of nodes by using a distributed technology. For example, a user configuration management module in the privacy center module may be disposed in a CDC, and a privacy configuration file management module and a policy engine in the privacy center module may be disposed in a VDC.

Optionally, a VIU with high computing power may also be configured to process a business. Therefore, a privacy proxy module, a processing module, and a middleware module may also be disposed in the VIU.

It should be understood that FIG. 2 to FIG. 5 are merely used as examples to describe possible application scenarios in embodiments of this application, and an application scenario obtained by performing proper transformation, addition, or deletion based on those in FIG. 2 to FIG. 5 is also applicable to the method in the embodiments of this application.

According to the vehicle data management method provided in embodiments of this application, the following functions can be implemented: based on resource management and capabilities that are platform-based and service-oriented in a vehicle, associating a privacy configuration of a user with a data service-oriented interface at a bottom layer of a system and platform capabilities such as a communication protocol interface, implementing quantitative evaluation of data privacy sensitivity based on a quantitative tag used in data classification and rating, and limiting a data life cycle stage and a business range of privacy protection based on a configuration file.

In this embodiment of this application, customized centralized management of the entire data life cycle can be implemented, including data collection, sharing, transmission, storage, and the like. In addition, management and control requirements for different procedures in privacy configuration may be tagged based on characteristics corresponding to different data processing procedures (for example, collection, sharing, transmission, and storage).

Figure 6:
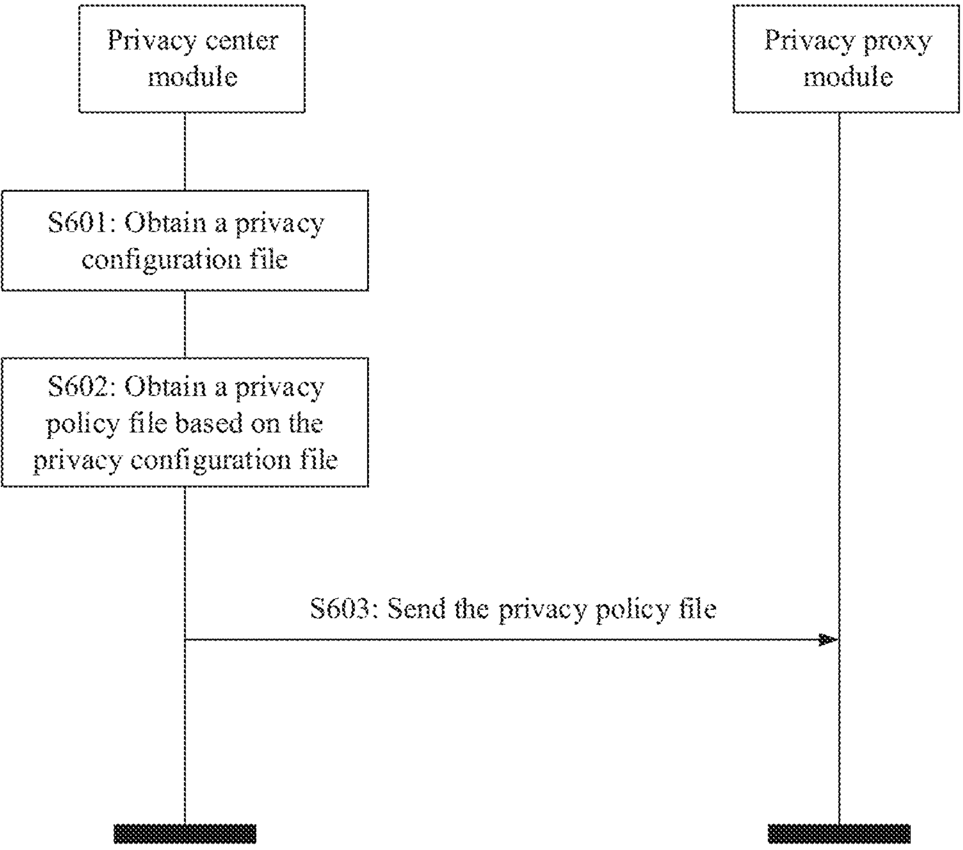
FIG. 6 is a specific implementation of privacy file configuration applied to a vehicle according to an embodiment of this application.

FIG. 6 is a specific implementation of a privacy file configuration method applied to a vehicle according to an embodiment of this application. The method may be executed by the privacy center module and the privacy proxy module in FIG. 2 to FIG. 5. As shown in FIG. 6, the method includes steps S601 to S603.

S601: A privacy center module obtains a privacy configuration file, where the privacy configuration file is a file used to define a privacy configuration.

Optionally, the privacy configuration file may be defined by an original equipment manufacturer (OEM), provided to a cloud server, and then delivered by the cloud server to the privacy center module.

In some examples, the privacy configuration file may include but is not limited to the following content: an identifier defining a business, an identifier defining a service, an identifier defining a different data life cycle stage, information indicating an association relationship between a business and a service, and information indicating an association relationship between businesses. Based on the foregoing information, the privacy configuration file implements a privacy policy file that restricts data use by a business.

The data life cycle may include but is not limited to the following stages: data collection, data sharing, data transmission, and data storage.

Data collection may mean that a business obtains data from a service, or may be understood as that a business collects and obtains data from a bottom-layer program. For example, a reverse parking video business collects video data through an in-vehicle camera service. For another example, a vehicle-level upgrade business collects vehicle driving status information by using a vehicle body data service of a VDC. For another example, the pet mode business collects temperature status information in the vehicle by using a temperature monitoring service of a TMS.

Data sharing may mean that one business provides shared data to another business, where data sharing occurs at a business layer. As an example, data sharing includes two types: broadcast and publish/subscribe. Broadcast means that a business that provides shared data can send the shared data through broadcast. Publish/subscribe means that a business that needs to obtain shared data obtains the shared data after subscription, in other words, sending of the shared data is directional. Broadcast is used as an example. A remote diagnosis business may provide component running information for the vehicle-level upgrade business as shared data. Publish/subscribe is used as an example. An event data recorder (EDR) business provides component fault data as shared data for a fault locating business. The EDR business is used to record fault data of the vehicle.

Data transmission may mean that a business transmits data in a vehicle to a device outside the vehicle. A data receiver is not limited in data transmission. The receiver may be a cloud server, another vehicle, or another communication device. For example, the pet mode business transmits in-vehicle status information to a mobile phone of a vehicle owner. Alternatively, the vehicle-level upgrade business transmits status information of an internal component of the vehicle to the cloud server.

Data storage refers to transmission of data in the vehicle to a storage device, and the storage device may be managed by a data storage management module. The storage device may be disposed in the vehicle, or may be disposed on the cloud server. Correspondingly, the data storage management module may also be disposed in the vehicle or the cloud server. The data storage management module and the storage device may be disposed in a same physical apparatus, or may be disposed in different physical apparatuses. Data storage may be initiated by a business. For example, the reverse parking video business stores video data in the cloud server or a local storage device.

The identifier defining a business may be understood as an identifier of a top-level business perceptible to the user. The identifier of a service may be understood as a definition of an identifier field of a service that provides a personal data source in a system. The identifier of a data life cycle stage may be understood as an identifier allocated by the system to distinguish between different data life cycle stages of a business or a service. The foregoing information indicating the association relationship between a business and a service may be understood as an indication of a relationship between a top-level business perceptible to the user and one or more services corresponding to data that may be related to the business. The foregoing information indicating the association relationship between businesses may be understood as indicating a relationship between a top-level business perceptible to the user and one or more businesses corresponding to data that may be related to the business.

The identifier defining a business may include but is not limited to a client identifier, a service identifier, and a process identifier.

The identifier defining a service may include a service identifier.

Optionally, the identifier defining a business includes at least one of the following: an identifier defining the business in a different data life cycle stage and an identifier defining the business in a different communication protocol.

Optionally, the identifier defining a service includes at least one of the following: an identifier defining a service in a different data life cycle stage and an identifier defining a service in a different communication protocol.

The communication protocol is intended to provide a set of standard protocols for objects performing information interaction to ensure correct implementation of communication. A service-oriented protocol in the industrial field is used to provide a centralized middleware, support centralized communication service management, and provide a control point for privacy management. In common in-vehicle communication solutions, a hypertext transfer protocol (HTTP) and a message queuing telemetry transmission (MQTT) SOA communication solution are also provided.

For example, the communication protocol may include but is not limited to the following: a scalable service-oriented middleware over internet protocol (SOME/IP), a data distribution service (DDS), a web-enabled data distribution service (DDS-WEB), and the like.

Optionally, the privacy file further includes privacy rating information, and the privacy rating information indicates privacy levels of data corresponding to different service identifiers.

In a specific example, the privacy rating information may indicate data sensitivity by using tags such as sensitive, normal, or non-personal data. In some other examples, quantization values may be used for the privacy rating information in sensitivity measurement. For example, a measurement value of a service with sensitive personal data is 5 to 10, a measurement value of normal personal data is 1 to 4, and a measurement value of non-personal data is 0. An overall privacy measurement value of a business is a sum of all data.

In this embodiment of this application, the privacy rating information is associated with the service identifier, to identify and manage privacy data during business processing based on the SOA. In this way, efficiency of privacy data management of the vehicle is improved.

Figure 8:
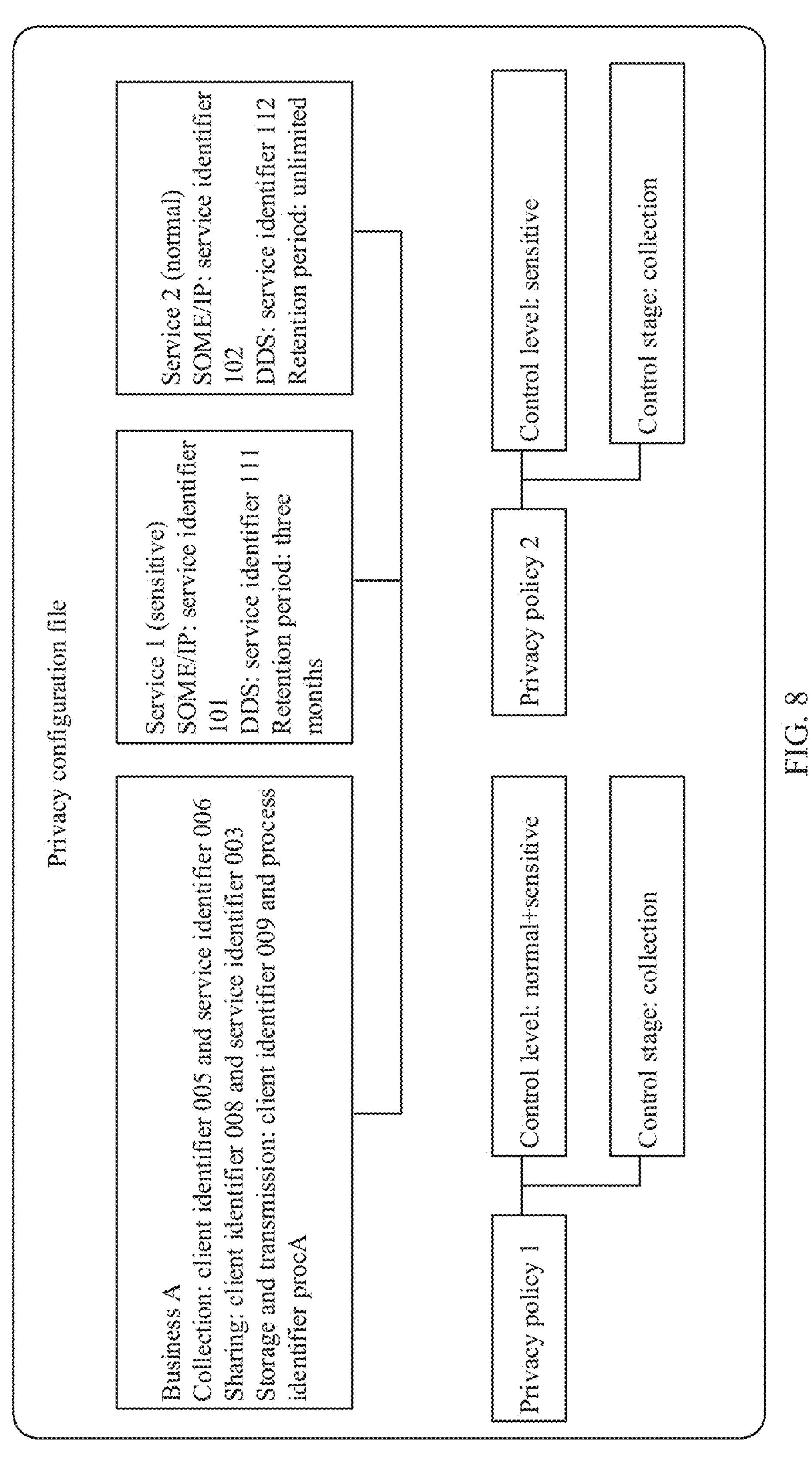
FIG. 8 is a schematic diagram of a privacy configuration file according to an embodiment of this application.
Figure 9:
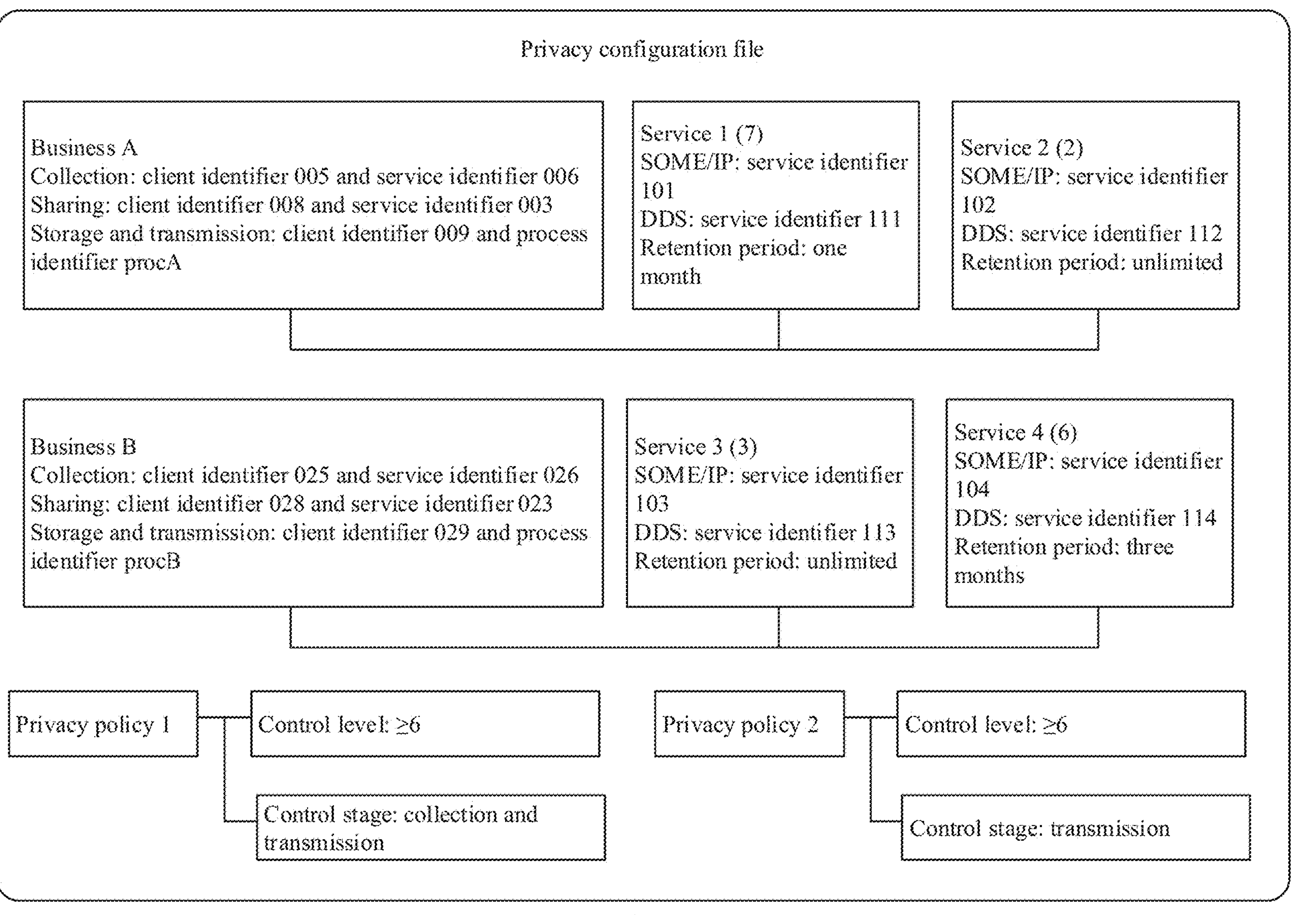
FIG. 9 is a schematic diagram of a privacy configuration file according to an embodiment of this application.

Optionally, in this embodiment of this application, privacy control policies for different data life cycle stages may be further set in the privacy configuration file. For example, as shown in FIG. 8 and FIG. 9, different privacy policies may be set for a data collection process and a data transmission process.

S602: The privacy center module obtains the privacy policy file based on the privacy configuration file, where the privacy policy file includes at least one of the following: first configuration information indicating an access permission between a business and a service or an access permission between businesses, and second configuration information indicating an access permission of a business.

The privacy policy file may be used to perform privacy management and control on a business that passes through a middleware module. Alternatively, it may be understood that the privacy policy file may implement a function of a data-related permission control list.

In some examples, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain the shared data. The former may be used for privacy access control during data collection. The latter may be used for privacy access control during data sharing.

In some examples, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data. The second configuration information may be used for privacy access control during data collection, data transmission to the outside of the vehicle, data sharing, and the like.

S603: The privacy center module sends the privacy policy file to the privacy proxy module. Correspondingly, the privacy proxy module receives the privacy policy file from the privacy center module, where the privacy policy file is used for access control of the middleware module.

The foregoing access control on the middleware module may be understood as access control on a business processed by the middleware module.

Optionally, in S603, that the privacy center module obtains the privacy policy file based on the privacy configuration file includes: The privacy center module presents a privacy configuration option to the user in a display interface based on the privacy configuration file, where the privacy configuration option is used by the user to select at least one of the following: whether to authorize a business to invoke data of at least one service, and whether to authorize a business to invoke data of at least one other business; the privacy center module obtains a result of selection performed by the user on the privacy configuration option; and the privacy center module obtains the privacy policy file based on the selection result.

For example, the display interface may be an HMI in a vehicle cockpit, or may be an HMI on a mobile phone.

Optionally, in S603, that the privacy center module obtains the privacy policy file based on the privacy configuration file further includes: The privacy center module obtains, from the privacy configuration file, a privacy statement file corresponding to a first business; and the privacy center module presents, to the user in the display interface, the privacy statement file corresponding to the first business.

In some examples, the privacy center module may directly generate all or a part of the privacy policy file based on the privacy configuration file when the user does not make selection.

Optionally, the privacy policy file may be dynamically updated. For example, after the privacy policy file is generated, if the user changes the privacy configuration option in the display interface, the privacy center module may correspondingly update the privacy policy file.

Optionally, the privacy center module may determine a user account (or a user identity) based on login information of the user, and bind the privacy policy file to the user account. In other words, the privacy center module may also generate and maintain different privacy policy files for different users, to improve privacy management efficiency.

In this embodiment of this application, a privacy configuration solution based on an SOA for a vehicle is provided. A privacy center module is used to obtain a privacy configuration file, generate a privacy policy file, and distribute the privacy policy file to a privacy proxy module close to a business. The privacy proxy module is configured to manage and control, based on the privacy policy file, privacy data of a business processed by a middleware module, so that all businesses in the vehicle cannot bypass privacy management and control. This provides an end-to-end privacy management and control service from a business end to a bottom-layer data end. Associating a privacy configuration of a user with a data service-oriented interface at a bottom layer of a system can provide centralized privacy management and control for a heterogeneous architecture in the vehicle. In this way, security and efficiency of privacy management and control can be improved.

Figure 7:
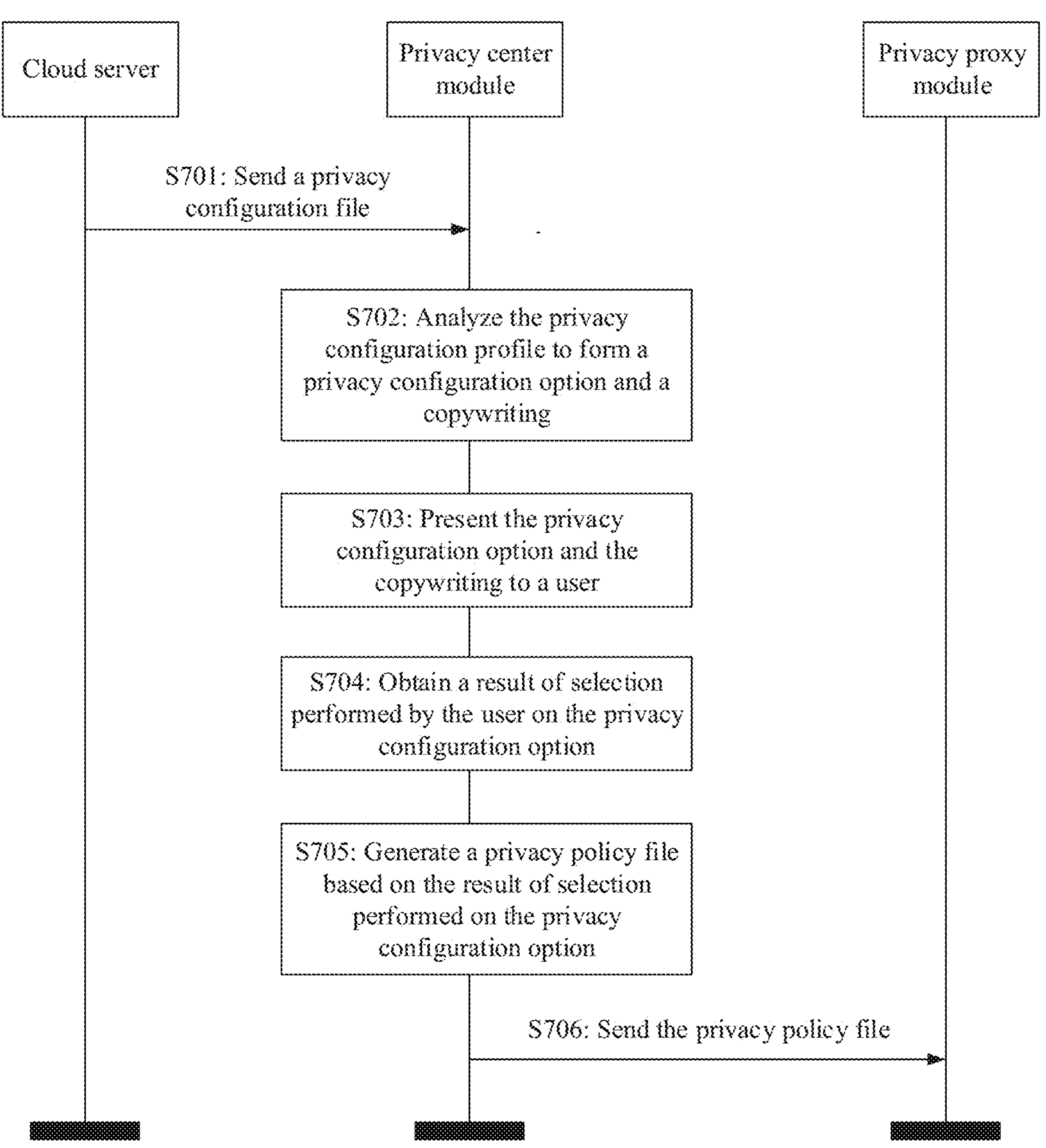
FIG. 7 is a specific implementation of privacy file configuration applied to a vehicle according to an embodiment of this application.

FIG. 7 is a specific implementation of privacy file configuration applied to a vehicle according to an embodiment of this application. As shown in FIG. 7, the method includes steps S701 to S706.

S701: A cloud server sends a privacy configuration file to a privacy center module, and correspondingly, the privacy center module receives the privacy configuration file.

Optionally, the identifier defining a business may include an identifier defining the business in a different data life cycle stage and an identifier defining the business in a different communication protocol. To be specific, when the business is in different data life cycle stages or in different communication protocols, different identifiers may be allocated to the business. It should be understood that, in some examples, a client identifier, a service identifier, and a process identifier may all be allocated to the business in a same data life cycle stage or in a same communication protocol, or only some of the three identifiers are allocated.

For example, FIG. 8 is a schematic diagram of a privacy configuration file according to an embodiment of this application. As shown in FIG. 8, for a privacy business A, a client identifier is 005 and a service identifier is 006 in a data collection stage; the client identifier is 008 and the service identifier is 003 in a data sharing stage; and the client identifier is 009 and a process identifier is proc A in a data storage and data transmission stage.

Optionally, the identifier defining a service may include an identifier defining a service in a different data life cycle stage and an identifier defining a service in a different communication protocol. To be specific, when the service is in different data life cycle stages or in different communication protocols, different identifiers may be allocated to the service.

For example, still refer to FIG. 8. When a corresponding communication protocol of a service 1 is SOME/IP, a service identifier is 101. When the corresponding communication protocol of the service 1 is DDS, the service identifier is 111.

In a vehicle design stage, all personal data for various businesses in the vehicle needs to be identified. When the data is invoked through service-oriented interfaces, the data can be managed and controlled in a centralized manner. A specific management and control mode depends on a definition mode of service invocation. Invocation of a service-oriented interface of SOME/IP is used as an example. In a design stage, a service identifier of each service can be defined and used as an identifier of a data provider. The data provider can be a program that produces the data or a program that provides shared data. An upper-layer business can collect personal data after invoking a service. In the design stage, a client identifier is also defined, and is used as an identifier of a data invoker. When the client identifier is associated with the service identifier, a data-related permission control list is formed, that is, a matrix can be used for personal data within a scope allowed by a design.

In some examples, the client identifier and the service identifier have no privacy significance. To implement precise control, privacy rating information may be added to the privacy configuration file, to identify a data privacy rating level of each service. As shown in FIG. 8, the service 1 and a service 2 are two different types of personal data sources provided for an upper-layer business in the vehicle. If the service 1 has high sensitivity, a sensitive tag can be added to a privacy configuration file. For the service 2 that is less sensitive, a normal tag can be added to the privacy configuration file. Privacy management requirements in different scenarios can be filtered based on tags.

FIG. 9 is a schematic diagram of a privacy configuration file according to an embodiment of this application. Optionally, as shown in FIG. 9, in addition to the foregoing sensitive/normal rating manner, quantization values may be used for the privacy rating information in sensitivity measurement. For example, it is assumed that a measurement value of a service with sensitive personal data is 5 to 10, a measurement value of normal personal data is 1 to 4, and a measurement value of non-personal data is 0, an overall privacy measurement value of a business is a sum of all data. A privacy range can be customized based on a privacy management requirement. A business that falls within the privacy range is subject to privacy control. It should be understood that the specific implementations of the foregoing quantization value are merely used as examples, and another specific implementation may also be used for an association relationship between a quantization value and privacy rating. For example, a larger quantization value indicates lower privacy rating. Similar cases are not listed one by one herein.

Optionally, the privacy rating information may be applied to a privacy control policy in each stage of the data life cycle. For example, an access permission and a retention period of each piece of data may be determined based on the privacy rating information. As shown in FIG. 8, if privacy rating information of the service 1 is sensitive, a retention period is three months, to be specific, the data needs to be deleted when stored for three months. If privacy rating information of the service 2 is normal, a retention period is not limited. As shown in FIG. 9, when quantization values are used for measurement, if the privacy rating information of the service 1 is 7, the retention period is one month; if the privacy rating information of the service 2 is 2, a retention period is not limited; and if privacy rating information of a service 4 is 6, a retention period is three months.

In addition, the privacy configuration file may also include one or more privacy policies. These privacy policies can be applied to stages of the data life cycle, and different privacy policies can be determined based on privacy rating information. After receiving the privacy configuration file, the privacy center module may select a privacy policy for a current privacy policy file. For example, in FIG. 8, in the data collection stage, a privacy policy 1 manages and controls a service whose privacy rating information has the normal tag or the sensitive tag. In the data collection stage, a privacy policy 2 only manages and controls a service whose privacy rating information has the sensitive tag. For another example, in FIG. 9, the privacy policy 1 manages and controls a service whose measurement value is greater than or equal to 6 in both the data collection stage and the data transmission stage, and the privacy policy 2 manages and controls a service whose measurement value is greater than or equal to 6 only in the data transmission stage.

In embodiments of this application, for a problem that there are various types of privacy data but there is no collective management and control mechanism, sources providing data are classified based on service identifiers. Based on a service-oriented platform, in addition to the service identifier, a quantitative tag is used in data classification and rating, to implement quantitative evaluation of data privacy sensitivity. This improves efficiency of privacy data management.

S702: The privacy center module analyzes the privacy configuration file to form a privacy configuration option and a copywriting.

S703: The privacy center module presents the privacy configuration option and the copywriting to the user.

S704: The privacy center module obtains a result of selection performed by the user on the privacy configuration option.

For example, if the user reads the copywriting and approves a corresponding privacy configuration by performing an operation on a selection button, the privacy center module obtains the selection result.

Figure 10:
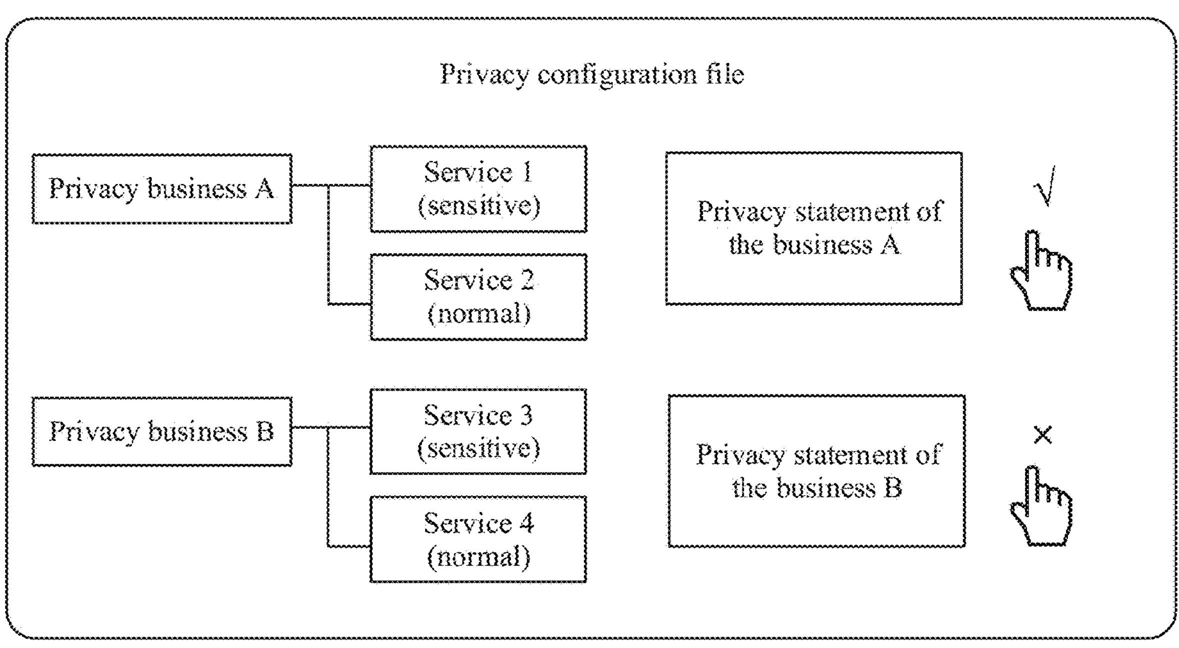
FIG. 10 is a schematic diagram of a privacy configuration file according to an embodiment of this application.

For example, FIG. 10 is a schematic diagram of a privacy configuration file according to an embodiment of this application. As shown in FIG. 10, a privacy statement may be configured for each business in the privacy configuration file. The privacy statement may be presented in a user interface by using an independent entry, and a selection button is displayed. A user can choose to approve or reject authorization at will. The privacy statement can be packed in the privacy configuration file and delivered.

S705: The privacy center module generates a privacy policy file based on the result of selection performed on the privacy configuration option.

In some examples, the privacy center module may bind the privacy configuration approved by the user to an account of the user, and generate a privacy policy file corresponding to the user.

In some examples, the privacy center module may directly generate all or a part of the privacy policy file based on the privacy configuration file when the user does not make selection.

In this embodiment of this application, the privacy center module binds every business with an approval state of the user. In this case, a business behavior needs to comply with a user's intent, and the user's intent cannot be bypassed. In this way, a solution for privacy protection from a business end to a data end is implemented.

S706: The privacy center module sends the privacy policy file to each privacy proxy module, and correspondingly, each privacy proxy module receives the privacy policy file from the privacy center module.

Optionally, the privacy policy file may be distributed to each privacy proxy module, and each privacy proxy module is configured to perform privacy management and control on a nearby business based on the privacy policy file. Each privacy proxy module is configured to perform access control with a middleware module. Because data invocation by all businesses in a vehicle is implemented through a platform provided by the middleware module, all businesses are monitored by the privacy proxy module. In this way, a strict and secure privacy monitoring solution is implemented.

In this embodiment of this application, the privacy center module may generate a privacy policy file based on a privacy definition file, where the privacy policy file is used to provide a privacy configuration for data invocation by an upper-layer business; and bind an upper-layer business with bottom-layer data by using a middleware module as a platform. In this case, a business access behavior needs to comply with a system setting or a user's intent, and the system setting or the user's intent cannot be bypassed. In this way, a solution for privacy protection from a business end to a data end is implemented, and efficiency and security of vehicle privacy management and control are improved.

In this application, privacy management and control during data collection, sharing, transmission, and storage can be implemented based on a middleware module provided by a system platform. A principle of privacy management and control is as follows. When a business invokes data, the business collectively invokes the data through the middleware module based on an SOA principle of a vehicle. The middleware module determines, by using a privacy proxy module, whether the data invocation is within an access scope allowed by a privacy policy file. The business can invoke the data only when the data invocation is within the access scope. In this solution, a privacy configuration of a user is associated with a system privacy control point to implement an end-to-end privacy management and control procedure. Even in a heterogeneous architecture, data invocation by any upper-layer business cannot bypass privacy management and control. This improves efficiency and security of vehicle privacy management and control. The following describes in detail a data management method for different data life cycle stages according to an embodiment of this application with reference to an accompanying drawing.

Figure 11:
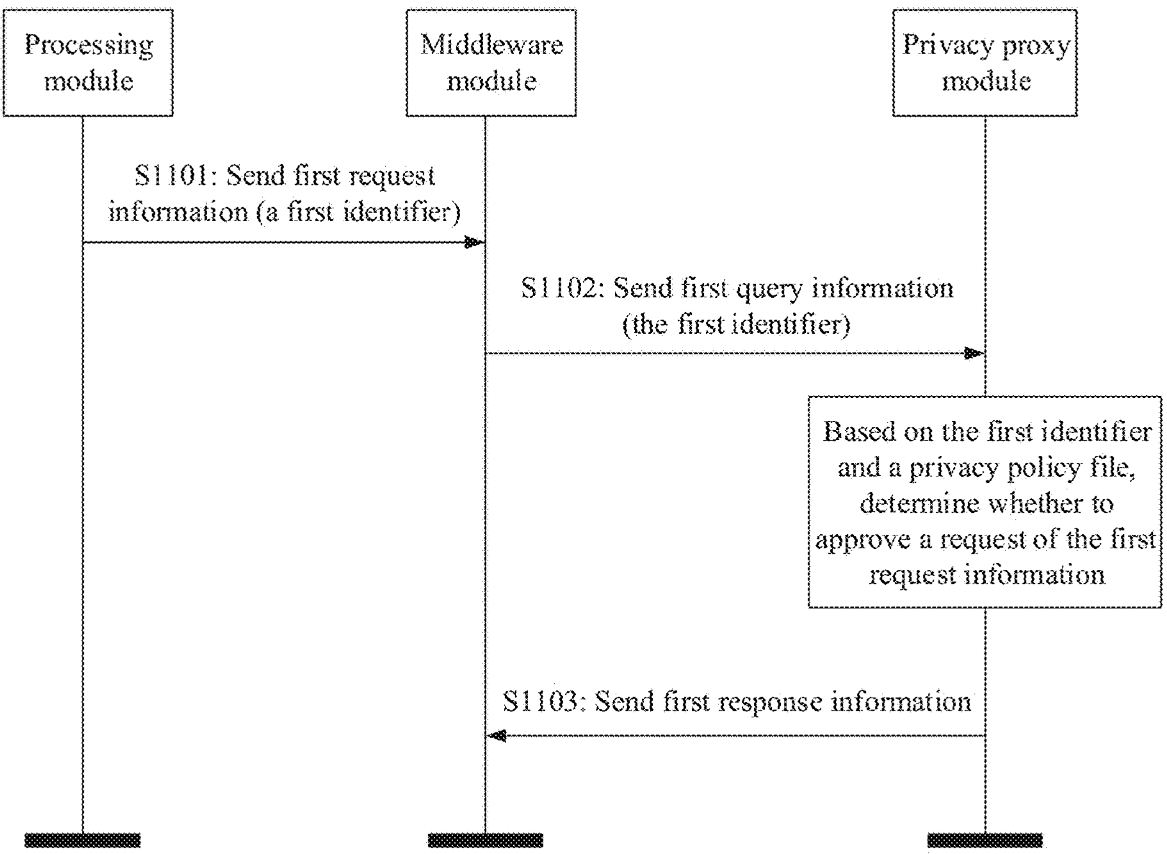
FIG. 11 is a schematic diagram of a data management method according to an embodiment of this application.

FIG. 11 is a schematic diagram of a data management method according to an embodiment of this application. FIG. 11 may include a process including data collection, data sharing, and data transmission. As shown in FIG. 11, the method includes steps S1101 to S1103.

S1101: A processing module sends first request information to a middleware module, and correspondingly, the middleware module receives the first request information from the processing module. The first request information is used to request to invoke first data for a first business. The first request information includes a first identifier. The first identifier includes at least one of the following: a client identifier of the first business, a process identifier of the first business, or a service identifier of a provider of the first data.

Optionally, the first business invokes the first data in any one of the following manners: data collection, data sharing, and data transmission to the outside of a vehicle.

Optionally, based on different data life cycle stages of the invoked first data, the first request information may include but is not limited to data collection request information, data sharing request information, data transmission request information, and the like. The first data may include but is not limited to to-be-collected data, to-be-shared data, to-be-transmitted data, and the like.

S1102: The middleware module sends first query information to a privacy proxy module, and correspondingly, the privacy proxy module receives the first query information from the middleware module. The first query information is used to query whether invocation of the first data for the first business is approved, and the first query information includes a first identifier.

S1103: The privacy proxy module sends first response information to the middleware module, and correspondingly, the middleware module receives the first response information from the privacy proxy module. The first response information indicates whether invocation of the first data for the first business is approved, where the first response information is determined based on the first identifier and a privacy policy file. The privacy policy file includes at least one of the following: first configuration information indicating an access permission between a business and a service or an access permission between businesses, and second configuration information indicating an access permission of a business.

Optionally, after the middleware module receives the first response information, if the first response information is that invocation of the first data for the first business is approved, the middleware module invokes the first data for the first business. For example, in the case of data collection, the middleware module obtains the first data from a service, and sends the first data to the processing module. If the first response information is that invocation of the first data for the first business is disapproved, the middleware module notifies the processing module that invocation of the first data is not allowed.

In some examples, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data.

The first configuration information specifies an association relationship between a data invoker and a data provider. To be specific, the first business is allowed to invoke the data only when both the data invoker and the data provider meet a provision of the first configuration information.

For example, it is assumed that the first business invokes the first data in a manner of data collection. In this case, the first identifier may include the client identifier of the first business and a service identifier of a first service. When the client identifier of the first business and the service identifier of the first service belong to the first association relationship indicated by the first configuration information, the privacy proxy module sends the first response information to the middleware module, where the first response information indicates that invocation of the first data for the first business is approved.

For another example, it is assumed that the first business invokes the first data in a manner of data sharing, the first data is data of a second business, and a type of data sharing is publish/subscribe. In this case, the first identifier includes the client identifier of the first business and a service identifier of the second business. Publish/subscribe means that the data invoker can obtain the shared data only through subscription, that is, sending of the data is directional. When the client identifier of the first business and a service identifier of a second service belong to the second association relationship indicated by the first configuration information, the privacy proxy module sends the first response information to the middleware module, where the first response information indicates that invocation of the first data for the first business is approved.

In some examples, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data.

The second configuration information defines a qualification of only one of the data invoker and the data provider, that is, when one of the data invoker and the data provider meets a requirement of the first configuration information, the data may be invoked.

For example, it is assumed that the first business invokes the first data in the manner of data collection. In this case, the first identifier may include the client identifier of the first business. The privacy proxy module may send the first response information to the middleware module when the first identifier belongs to the client identifier that is of the business allowed to collect data and that is indicated by the second configuration information, where the first response information indicates that invocation of the first data for the first business is approved.

For another example, it is assumed that the first business invokes the first data in a manner of data transmission to the outside of the vehicle. In this case, the first identifier may include the client identifier or the process identifier of the first business. The privacy proxy module may send the first response information to the middleware module when the first identifier belongs to the client identifier or the process identifier that is of the business allowed to transmit data to the outside of the vehicle and that is indicated by the second configuration information, where the first response information indicates that invocation of the first data for the first business is approved.

For another example, it is assumed that the first business invokes the first data in a manner of data sharing, the first data is data of a second business, and a type of data sharing is broadcast. In this case, the first identifier includes a service identifier of the second business, that is, a service identifier of the data provider. Broadcast means that the data provider may send shared data through broadcast. Sending of the data is not directional. Any data invoker can obtain the shared data. The privacy proxy module sends the first response information to the middleware module when the first identifier belongs to the service identifier that is of the business allowed to provide shared data and that is indicated by the second configuration information, where the first response information indicates that invocation of the first data for the first business is approved.

In this embodiment of this application, privacy management and control of data can be implemented based on a middleware module provided by a system platform. For example, during data collection, data sharing, and data transmission to the outside of the vehicle, when a business invokes data, the business invokes the data through the middleware module based on an SOA principle of the vehicle. The middleware module determines, by using a privacy proxy module, whether the invocation is within a scope allowed by a privacy policy file. A privacy control node is added based on the platform mechanism of the system, to manage and control a business executed by the middleware module and implement privacy data collection control method that cannot be bypassed by an upper-layer business. This improves efficiency and security of vehicle privacy management and control.

Figures 12, 13:
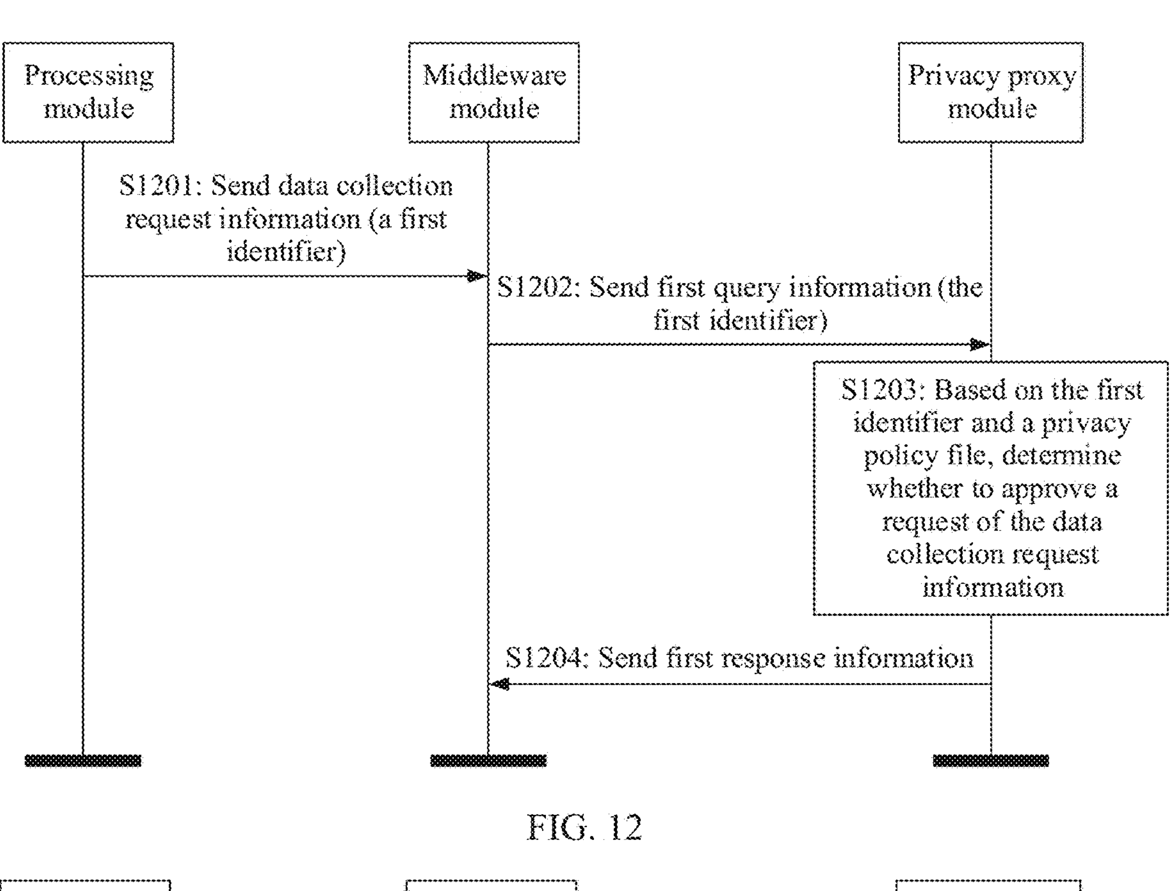
FIG. 12 is a specific implementation of a data management method used for data collection according to an embodiment of this application.
FIG. 13 is a schematic diagram of a data management method used for data sharing according to an embodiment of this application.

FIG. 12 is a specific implementation of a data management method used for data collection according to an embodiment of this application. As shown in FIG. 12, the method includes steps S1201 to S1204.

S1201: A processing module sends data collection request information to a middleware module, and correspondingly, the middleware module receives the data collection request information from the processing module. The data collection request information is used to request to collect first data for a first business. The data collection request information includes a first identifier of the first business. The first identifier includes a client identifier of the first business, or the first identifier includes the client identifier of the first business and a service identifier of a first service. The first service is a provider of the to-be-collected first data.

As shown in FIG. 8 and FIG. 9, in the data collection process, when the business A collects the data of the service 1 or the service 2, the business A may serve as a data invoker, and the service 1 and the service 2 may serve as data providers. Therefore, in the data collection process, the business A uses the client identifier 005, the service 1 uses the service identifier 101, and the service 2 uses the service identifier 102.

S1202: The middleware module sends first query information to a privacy proxy module, and correspondingly, the privacy proxy module receives the first query information from the middleware module, where the first query information is used for querying whether collection of the first data for the first business is approved. The first query information includes the first identifier of the first business.

S1203: The privacy proxy module determines, based on the first identifier of the first business and a privacy policy file, whether to approve the request to collect the first data for the first business.

For example, the privacy proxy module may determine whether the client identifier of the first business and the first service identifier are in a first association relationship that is indicated by first configuration information in the privacy policy file and that is between a service identifier of a service that is allowed to provide data and a client identifier of a business that is allowed to collect data. If yes, collection is approved. If no, collection is disapproved.

For another example, the privacy proxy module may determine whether the client identifier of the first business belongs to a client identifier that is indicated by second configuration information in the privacy policy file and that is of a business allowed to collect data. If yes, collection is approved. If no, collection is disapproved.

In some examples, the privacy proxy module may further determine a current logged-in user account based on a current login status, to determine a privacy configuration of a user.

Optionally, in a privacy configuration stage, a service identifier may be allocated to the service that provides data. For a plurality of pieces of data that may be collected by a same business (namely, a same client identifier), the user may determine, based on service identifiers, whether to authorize corresponding data to each of the service identifiers.

S1204: The privacy proxy module sends first response information to the middleware module, and correspondingly, the middleware module receives the first response information from the privacy proxy module. The first response information indicates whether collection of the first data for the first business is approved.

Optionally, after the middleware module receives the first response information, if the first response information is that collection of the first data for the first business is approved, the middleware module collects the first data for the first business, and send the first data to the processing module. If the first response information is that collection of the first data for the first business is disapproved, the middleware module notifies the processing module that collection of the first data is not allowed.

In this embodiment of this application, privacy management and control for data collection can be implemented based on the middleware module provided by a system platform. When a business collects data, based on an SOA principle of a vehicle, the business collectively invokes services through the middleware module to implement data collection. The middleware module determines, by using a privacy proxy module, whether the data collection is within an access scope allowed by a privacy policy file. A privacy control node is added based on the platform mechanism of the system, to manage and control a business executed by the middleware module and implement privacy data collection control method that cannot be bypassed by an upper-layer business. A privacy configuration of a user is associated with the privacy control point of the system to implement an end-to-end privacy management and control procedure. This improves efficiency and security of vehicle privacy management and control.

FIG. 13 is a schematic diagram of a data management method used for data sharing according to an embodiment of this application. As shown in FIG. 13, the method includes steps S1301 to S1304.

S1301: A processing module sends data sharing request information to a middleware module, where the data sharing request information is used to request to share first data of a second business with a first business.

S1302: The middleware module sends first query information to a privacy proxy module, to query whether provision of the first data of the second business for the first business is approved. The first query information includes a first identifier. The first identifier includes a client identifier of the first business, or the first identifier includes the client identifier of the first business and a service identifier of the second business.

As shown in FIG. 9, when the business A provides the shared data for the business B, the business A functions as a service provider, and the business B functions as a service invoker. Therefore, in the data sharing process, the business A functioning as the service provider uses the service identifier 003, and the business B functioning as the service invoker uses a client identifier 028.

S1303: The privacy proxy module determines, based on the first identifier, whether to approve to share the first data of the second business with the first business.

For example, still refer to FIG. 9. When a sharing manner is broadcast, in other words, the business A sends the data through broadcast, the middleware module only needs to query whether the service identifier of the business A is within an access scope allowed by a privacy policy file, and query is not performed for the client identifier of the business B. If yes, sharing is allowed.

For another example, if the sharing manner is publish/subscribe, in other words, the business B obtains the data of the business A through subscription, the middleware module needs to query whether the service identifier of the business A and the client identifier of the business B are within the access scope allowed by the privacy policy file. If yes, sharing is allowed.

S1304. The privacy proxy module sends first response information to the middleware module. The first response information indicates whether sharing the first data of the second business with the first business is approved.

Optionally, after the middleware module receives the first response information, if the first response information is that data sharing is approved, the middleware module provides the first data of the second business for the first business. If the first response information is that data sharing is disapproved, the middleware module notifies the processing module that data sharing is disapproved.

In this embodiment of this application, based on the public middleware module provided by a system platform, privacy management and control may be implemented for data sharing. When data is shared between different businesses, based on an SOA implementation of a vehicle, the data passing through a middleware module is shared in a form of a service. The middleware module determines, by using a privacy proxy module, whether a business for sharing is within a sharing scope allowed by a privacy policy file. In this case, a system performs privacy management and control based on a client identifier or a service identifier of the business. In this way, a method for privacy management and control in data sharing is provided. This improves efficiency of vehicle privacy management and control.

Figure 14:
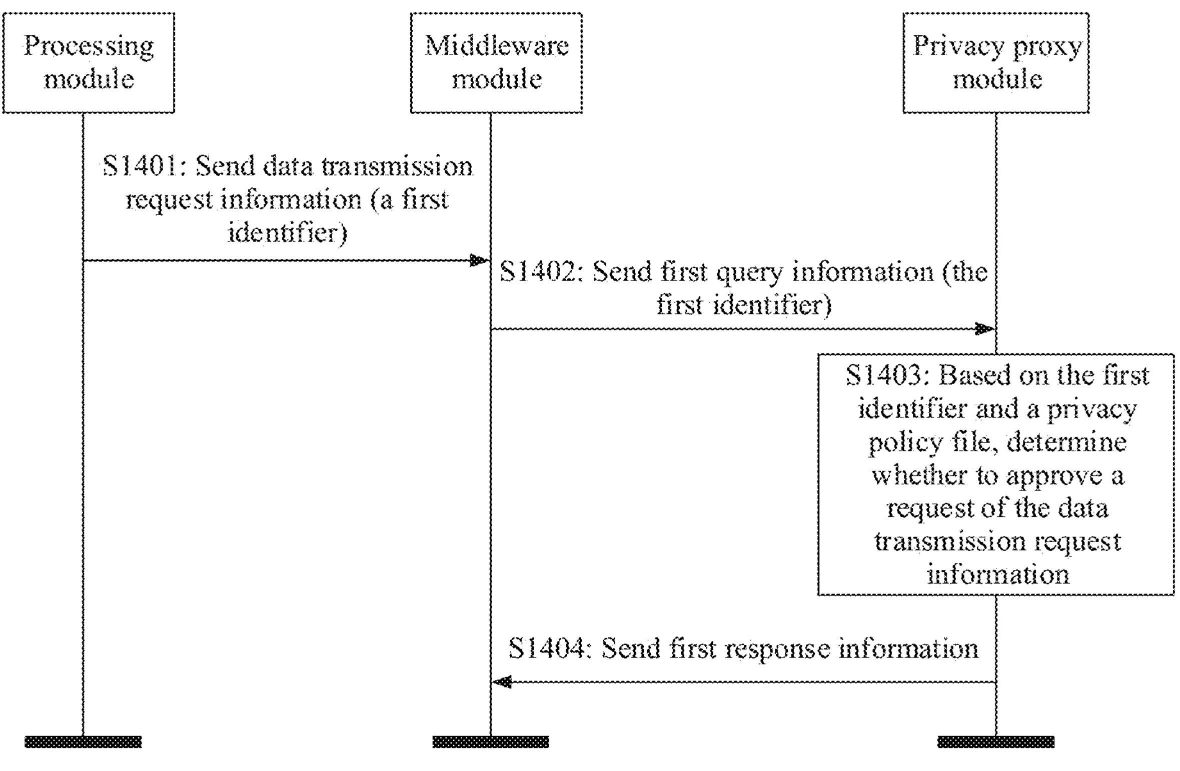
FIG. 14 is a schematic flowchart of a data management method for data transmission according to an embodiment of this application.

FIG. 14 is a schematic flowchart of a data management method for data transmission according to an embodiment of this application. As shown in FIG. 14, the method includes steps S1401 to S1404.

S1401: A processing module sends data transmission request information to a middleware module. The data transmission request information is used to request to transmit first data of a first business to a communication device outside a vehicle. The data transmission request information includes a first identifier. The first identifier includes a client identifier of the first business or a process identifier of the first business.

S1402: The middleware module sends first query information to a privacy proxy module. The first query information is used to request whether transmission of the first data to the outside of the vehicle is allowed. The first query information includes the first identifier.

For example, as shown in FIG. 8 and FIG. 9, in a process in which the business transmits data to the outside of the vehicle, the business A may use the process identifier pro A or the client identifier 009.

S1403: The privacy proxy module determines, based on the first identifier, whether the first business falls within a range of a business that is allowed in a privacy policy file and that is used to transmit data to the outside of the vehicle.

For example, if the first identifier belongs to a client identifier or a process identifier of the business that is allowed to transmit data to the outside of the vehicle and that is indicated by second configuration information in the privacy policy file, it is determined that transmission of the first data of the first business to the outside of the vehicle is approved.

S1404: The privacy proxy module sends first response information to the middleware module, to indicate whether request of the data transmission request information is approved.

Optionally, after the middleware module receives the first response information, if the first response information is that transmission of the first data to the outside of the vehicle is approved, the middleware module sends the first data to the outside of the vehicle. If the first response information is that transmission of the first data to the outside of the vehicle is disapproved, the middleware module notifies the processing module that transmission of the first data to the outside of the vehicle is not allowed.

In this embodiment of this application, privacy management and control may be further used for data transmission to the outside of the vehicle. When the data is transmitted to the outside of the vehicle, based on an SOA concept of the vehicle, the middleware module needs to become a platform. To be specific, an independent out-of-vehicle transmission protocol stack is not integrated for each business, but a public capability is used. When the data of the business needs to be transmitted to the outside of the vehicle, a process invokes the middleware module to perform collective scheduling. In this case, a system performs privacy management and control based on the process identifier or the client identifier of the business. In this case, a method for privacy management and control of vehicle data transmission to the outside of a vehicle is provided, to improve efficiency of vehicle privacy management and control.

The solution of this application may further implement privacy management and control in data storage. Data in a vehicle is usually stored on different nodes, such as domain controllers or ECUs. A data storage management module may be configured for storage management of the data in the vehicle. Optionally, the data storage management module may be disposed in the vehicle, or may be disposed on a cloud side. The following describes the solution for privacy management and control in data storage in this embodiment of this application with reference to the accompanying drawing.

Figure 15:
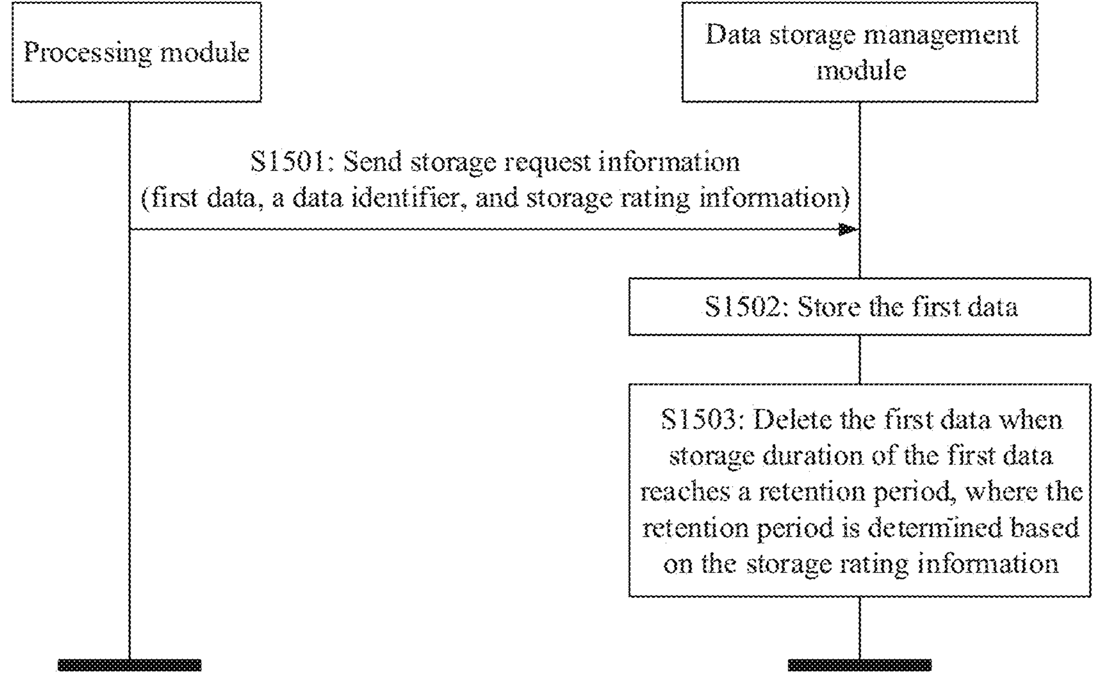
FIG. 15 is a data management method used for data storage according to an embodiment of this application.

FIG. 15 is a data management method used for data storage according to an embodiment of this application. As shown in FIG. 15, the method includes the following steps.

S1501: A processing module sends storage request information of a first business, and correspondingly, a data storage management module receives the storage request information of the first business. The storage request information includes to-be-stored first data, a data identifier of the first data, and storage rating information. The storage rating information indicates a privacy level corresponding to the data identifier of the first data.

Optionally, the data storage management module may be disposed in a vehicle, or may be disposed in a cloud server.

It should be noted that the storage rating information is different from the privacy rating information described above. The privacy rating information is usually used in processes of data collection, transmission, data sharing, or data storage. There is a binding relationship between the privacy rating information and a service identifier, to be specific, the service identifier corresponding to data needs to be provided in the data storage process. For example, if the data is collected from different services, the data has different service identifiers. The storage rating information is usually used only in data storage process. A correspondence between the storage rating information and a retention period may be defined in a preset file of a business, and the correspondence is also stored in a privacy configuration file. After a privacy proxy module analyzes the privacy configuration file and generates a privacy policy file, the correspondence between the storage rating information and the retention period is also stored in the privacy proxy module. There is a binding relationship between the storage rating information and the data identifier. When control needs to be performed based on rating in the storage process, a business carrying data, a data identifier, and storage rating information may apply for a storage file to the data storage management module.

In some examples, different data corresponding to a same business has different data identifiers, and different data identifiers may correspond to different storage rating information.

Optionally, a rating manner of the storage rating information is similar to that of the privacy rating information. To be specific, the manner of rating by using a tag or the manner of rating by using a quantization value is used, or another general rating manner may be used. For brevity, details are not described herein again.

S1502: The data storage management module stores the first data.

S1503: The data storage management module deletes the first data when storage duration of the first data reaches a retention period, where the retention period is determined based on the storage rating information.

Optionally, in S1503, the data storage management module may determine the retention period of the first data based on the storage rating information. In some examples, the data storage management module sends second query information to the privacy proxy module. The second query information is used to query the retention period of the first data, and the second query information includes the data identifier and the storage rating information of the first data. The data storage management module receives first indication information from the privacy proxy module, where the first indication information indicates the retention period of the first data. After the first data is flushed to a disk, the data storage management module may start a timer to time the storage duration of the first data, and delete the first data when the storage duration reaches the retention period.

Optionally, in S1502, the data storage management module may not obtain the retention period of the first data. Instead, the privacy proxy module times the storage duration of the first data, and indicates the data storage management module to delete the first data when the storage duration reaches the retention period. In some examples, the data storage management module sends second query information to the privacy proxy module in the vehicle. The second query information includes the data identifier of the first data, the storage rating information, and a flushing time of the first data. When the storage duration of the first data reaches the retention period, the data storage management module receives deletion indication information from the privacy proxy module, where the deletion indication information indicates to delete the first data.

Optionally, the data storage management module may be disposed in the vehicle, or may be disposed in the cloud server.

Optionally, the privacy proxy module may be disposed near the data storage management module. For example, if the data storage management module is disposed in the vehicle, the privacy proxy module may be disposed in the vehicle. If the data storage management module is disposed in the cloud server, the privacy proxy module may be disposed in the cloud server.

Further, the storage request information includes a first identifier, and the first identifier includes at least one of the following: a client identifier and a process identifier. The method further includes: The data storage management module determines, based on the first identifier, whether the first business has a storage permission; and when it is determined that the first business has the storage permission, the data storage management module flushes the data to the disk.

In this embodiment of this application, the privacy proxy module associates the retention period of the data with the storage rating information, and performs management and control. When performing storage management on the data in the vehicle, the data storage management module may obtain information related to the retention period by communicating with the privacy proxy module, so that data is deleted based on the retention period. In this way, privacy data is collectively managed and periodically deleted. This improves security and efficiency of vehicle data storage management.

Figure 16:
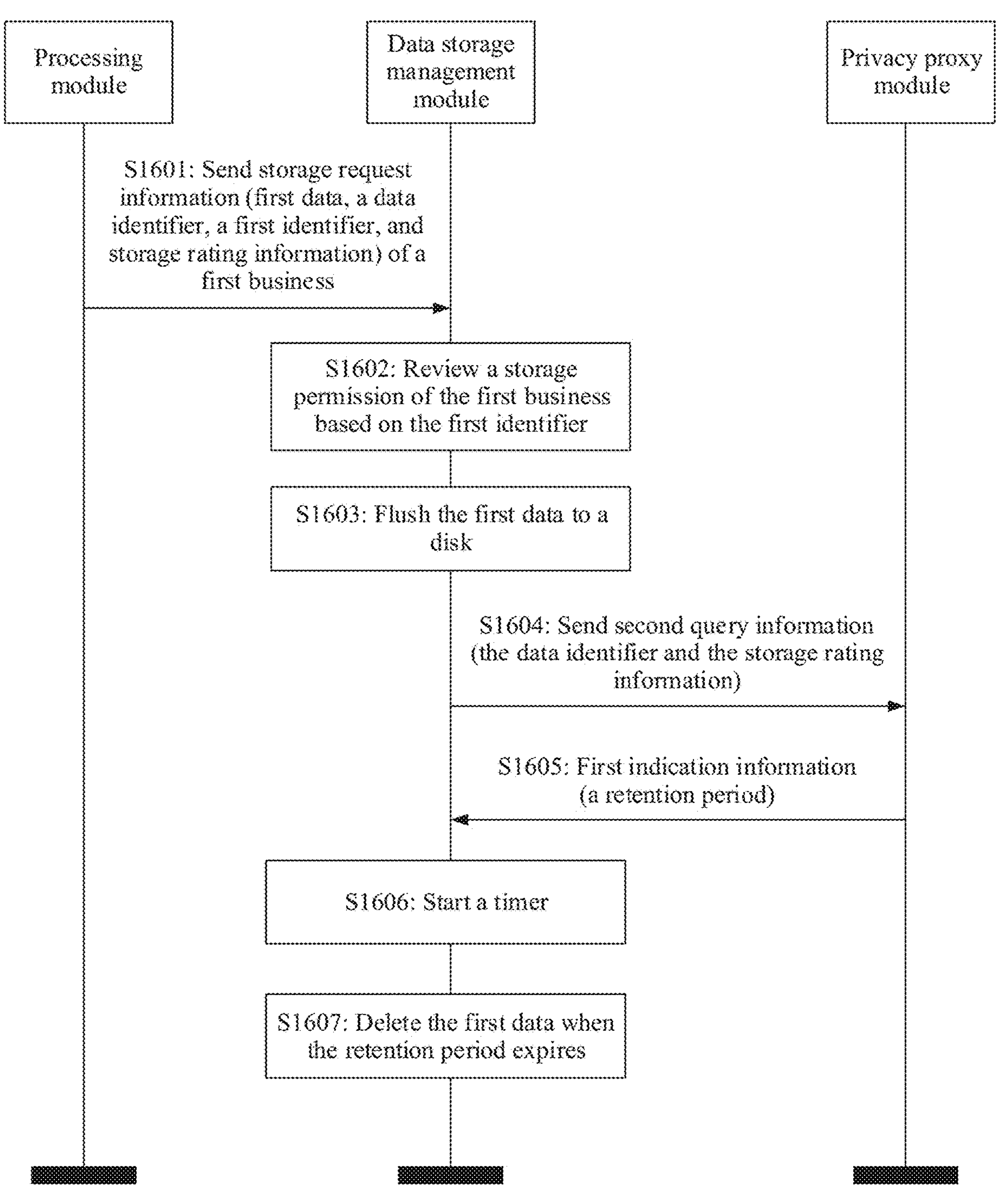
FIG. 16 is a schematic diagram of a specific flowchart of a data management method used for data storage according to an embodiment of this application.

FIG. 16 is a schematic diagram of a specific flowchart of a data management method used for data storage according to an embodiment of this application. As shown in FIG. 16, the method includes the following steps.

S1601: A processing module sends storage request information of a first business to a data storage management module, and correspondingly, the data storage management module receives the storage request information of the first business from the processing module. The storage request information includes to-be-stored first data, a data identifier of the first data, storage rating information, and a first identifier of the first data.

The first identifier of the first data may be a client identifier or a process identifier.

S1602: The data storage management module identifies the first identifier of the first business, and reviews a storage permission of the first business based on the first identifier.

S1603: After determining that the first business is eligible for storage, the data storage management module flushes the first data to a disk.

S1604: The data storage management module sends second query information to a privacy proxy module, and correspondingly, the privacy proxy module receives the second query information from the data storage management module. The second query information is used to query a retention period of the first data, and the second query information includes the data identifier and the storage rating information of the first data.

S1605: The data storage management module receives first indication information from the privacy proxy module, and correspondingly, the privacy proxy module receives the first indication information from the data storage management module. The first indication information indicates the retention period of the first data.

S1606: The data storage management module starts a timer, and the timer performs timing based on a retention period.

S1607: When the retention period expires, the data storage management module deletes the first data.

The data storage management module may bind the timer to the data identifier of the first data. When the retention period expires, the data storage management module may find the first data based on the data identifier, and delete the first data.

Figure 17:
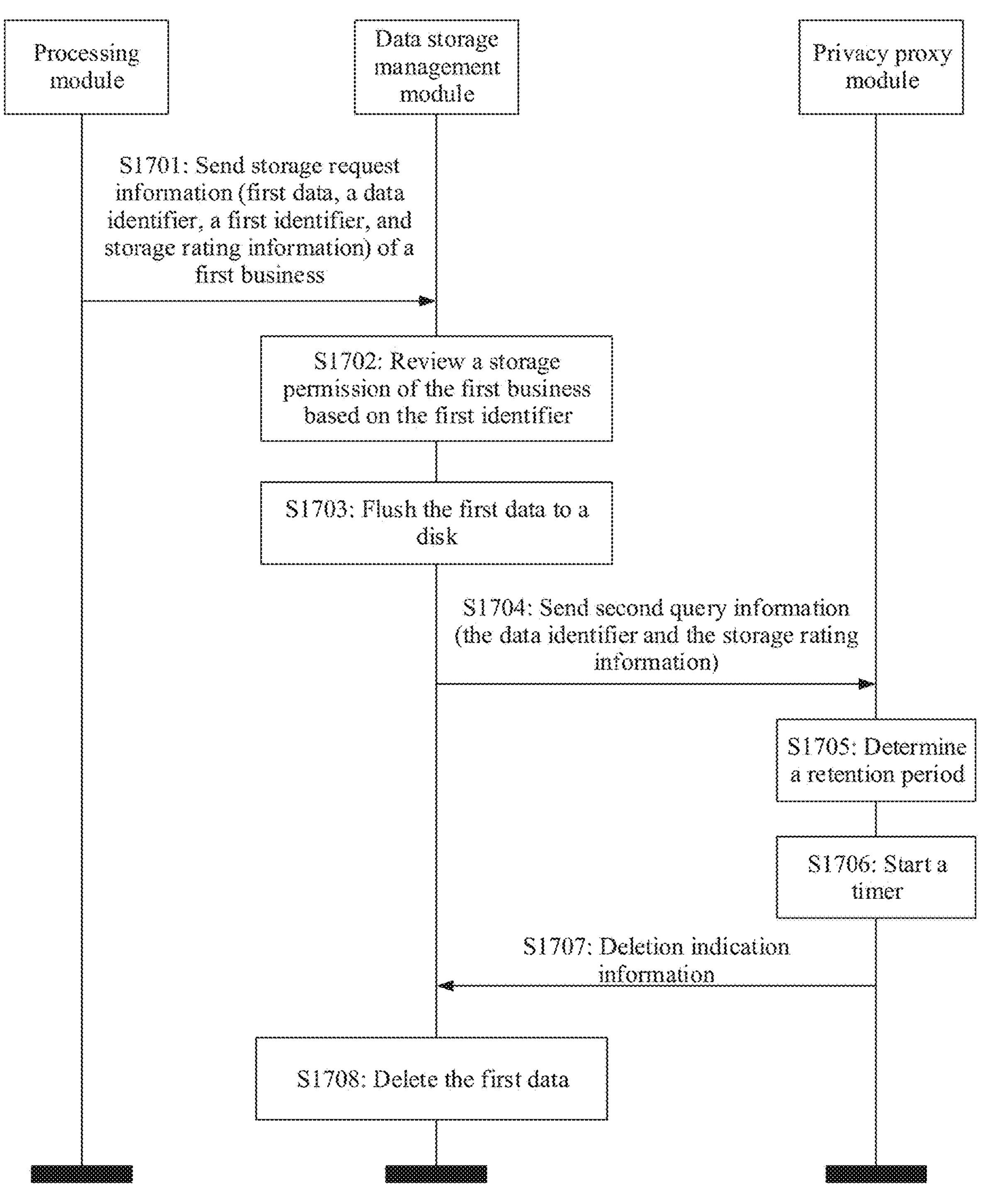
FIG. 17 is a schematic diagram of a specific flowchart of a data management method used for data storage according to an embodiment of this application.

FIG. 17 is a schematic diagram of a specific flowchart of a data management method used for data storage according to an embodiment of this application. As shown in FIG. 17, the method includes the following steps.

S1701: A processing module sends storage request information of a first business to a data storage management module. The storage request information includes to-be-stored first data, a data identifier of the first data, storage rating information of the first data, and a first identifier of the first data.

The first identifier of the first data may be a client identifier or a process identifier.

S1702: The data storage management module identifies the first identifier of the first business, and reviews a storage permission of the first business based on the first identifier.

S1703: After determining that the first business is eligible for storage, the data storage management module flushes the data to a disk.

S1704: The data storage management module sends second query information to the privacy proxy module in the vehicle, where the second query information includes the data identifier of the first data and the storage rating information.

S1705: The privacy proxy module may determine a retention period of the first data based on the storage rating information.

S1706: The privacy proxy module starts a timer, and the timer performs timing based on a retention period.

S1707: When storage duration of the first data reaches the retention period, the privacy proxy module sends deletion indication information to the data storage management module, where the deletion indication information indicates to delete the first data.

S1708: When receiving the deletion indication information, the data storage management module deletes the first data.

Figures 18, 19:
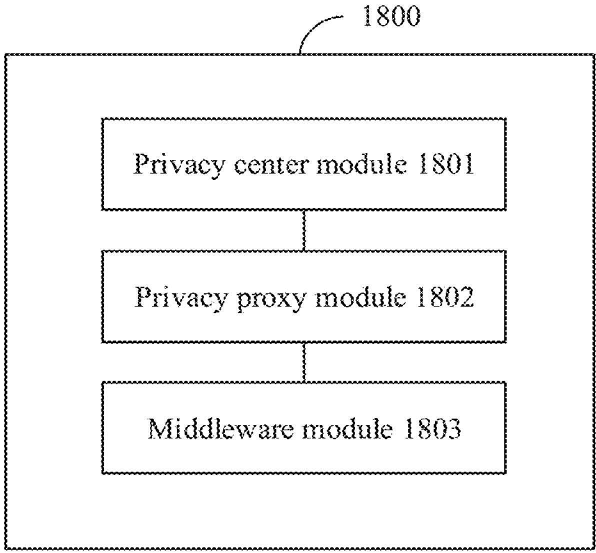
FIG. 18 is a schematic diagram of a structure of an apparatus 1800 according to an embodiment of this application.
FIG. 19 is a schematic diagram of a structure of an apparatus 1900 according to an embodiment of this application.

FIG. 18 is a schematic diagram of a structure of an apparatus 1800 according to an embodiment of this application. As shown in FIG. 18, the apparatus 1800 includes a privacy center module 1801, a privacy proxy module 1802, and a middleware module 1803. The apparatus 1800 may be the vehicle in the foregoing embodiments, or may be a component (for example, an in-vehicle device, a domain controller, or a chip) of the vehicle. The apparatus 1800 may implement steps or procedures performed by the vehicle corresponding to the foregoing method embodiments.

The privacy center module 1801 is configured to: obtain a privacy configuration file; obtain a privacy policy file based on the privacy configuration file, where the privacy policy file includes at least one of the following: first configuration information indicating an access permission between a business and a service or an access permission between businesses, and second configuration information indicating an access permission of a business; send the privacy policy file to the privacy proxy module 1802. The privacy policy file is used for access control of the middleware module 1803. The middleware module 1803 is configured to provide, for a business, an interface that is based on an SOA.

In some examples, the privacy center module 1801 is specifically configured to: present a privacy configuration option to a user in a display interface based on the privacy configuration file, where the privacy configuration option is used by the user to select at least one of the following: whether to authorize a business to invoke data of at least one service, and whether to authorize the business to invoke data of at least one other business; obtain a result of selection performed by the user on the privacy configuration option; and obtain the privacy policy file based on the selection result.

In some examples, the privacy center module 1801 is specifically configured to: obtain, from the privacy configuration file, a privacy statement file corresponding to the first business; and present, the privacy statement file corresponding to the first business to a user in a display interface.

In some examples, the privacy configuration file includes privacy rating information. The privacy rating information indicates privacy levels of data corresponding to different service identifiers. The service identifier is an identifier indicating a data provider.

In some examples, quantization values are used in the privacy rating information to distinguish between the privacy levels of data.

In some examples, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data. The client identifier is an identifier indicating a data invoker. The service identifier is an identifier indicating a data provider.

In some examples, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data. The client identifier is an identifier indicating a data invoker. The service identifier is an identifier indicating a data provider. The process identifier is an identifier of a business that is run as a process.

In some examples, the privacy configuration file includes at least one of the following: an identifier defining a business; an identifier defining a service; an identifier defining a different data life cycle stage; information indicating an association relationship between a business and a service; and information indicating an association relationship between businesses.

In some examples, the identifier defining a business includes at least one of the following: an identifier defining the business in a different data life cycle stage and an identifier defining the business in a different communication protocol; and the identifier defining a service includes at least one of the following: an identifier defining the service in a different data life cycle stage and an identifier defining the service in a different communication protocol.

FIG. 19 is a schematic diagram of a structure of an apparatus 1900 according to an embodiment of this application. As shown in FIG. 19, the apparatus 1900 includes a processing module 1901, a privacy proxy module 1902, and a middleware module 1903. The apparatus 1900 may be the vehicle in the foregoing embodiments, or may be a component (for example, an in-vehicle device, a domain controller, or a chip) of the vehicle. The apparatus 1900 may implement steps or procedures performed by the vehicle corresponding to the foregoing method embodiments.

The processing module 1901 is configured to send first request information to the middleware module 1903. The first request information is used to request to invoke first data for a first business. The first request information includes a first identifier. The first identifier includes at least one of the following: a client identifier of the first business, a process identifier of the first business, and a service identifier of a provider of the first data. The client identifier is an identifier indicating a data invoker. The service identifier is an identifier indicating a data provider. The process identifier is an identifier of a business that is run as a process.

The middleware module 1903 is configured to send first query information to the privacy proxy module 1902. The first query information is used to query whether invocation of the first data for the first business is approved. The first query information includes the first identifier. The middleware module 1903 is configured to provide, for a business in the in-vehicle device, an interface that is based on a service-oriented architecture SOA.

The privacy proxy module 1902 is configured to send first response information to the middleware module 1903. The first response information indicates whether invocation of the first data for the first business is approved. The first response information is determined based on the first identifier and a privacy policy file. The privacy policy file includes at least one of the following: first configuration information indicating an access permission between a business and a service or an access permission between businesses, and second configuration information indicating an access permission of a business.

In some examples, the first configuration information includes at least one of the following: information indicating a first association relationship between a service identifier of a service that is allowed to provide data and a client identifier of a business that is allowed to collect data; and information indicating a second association relationship between a service identifier of a business that is allowed to provide shared data and a client identifier of a business that is allowed to obtain shared data.

In some examples, the second configuration information includes at least one of the following: a client identifier of a business that is allowed to collect data; a client identifier or a process identifier of a business that is allowed to transmit data to the outside of the vehicle; a service identifier of a service that is allowed to provide data; and a service identifier of a business that is allowed to provide shared data.

In some examples, the first business invokes the first data in a manner of data collection. The first data is data of a first service. The first identifier includes the client identifier of the first business and a service identifier of the first service. The privacy proxy module 1902 is specifically configured to: when the client identifier of the first business and the service identifier of the first service belong to the first association relationship indicated by the first configuration information, send the first response information to the middleware module 1903. The first response information indicates that invocation of the first data for the first business is approved.

In some examples, the first business invokes the first data in a manner of data sharing. The first data is data of a second business. A type of data sharing is publish/subscribe. The first identifier includes the client identifier of the first business and a service identifier of the second business.

The privacy proxy module 1902 is specifically configured to: when the client identifier of the first business and a service identifier of a second service belong to the second association relationship indicated by the first configuration information, send the first response information to the middleware module 1903. The first response information indicates that invocation of the first data for the first business is approved.

In some examples, the first business invokes the first data in any one of the following manners: data collection and data transmission to the outside of the vehicle. The first identifier includes the client identifier of the first business or the process identifier of the first business. The privacy proxy module 1902 is specifically configured to: when the first identifier belongs to an access scope indicated by the second configuration information, send the first response information to the middleware module 1903. The first response information indicates that invocation of the first data for the first business is approved.

In some examples, the first business invokes the first data in a manner of data sharing. The first data is data of a second business. A type of data sharing is broadcast. The first identifier includes a service identifier of the second business. The privacy proxy module 1902 is specifically configured to: when the service identifier of the second business belongs to an access scope indicated by the second configuration information, send the first response information to the middleware module 1903. The first response information indicates that invocation of the first data for the first business is approved.

Figure 20:
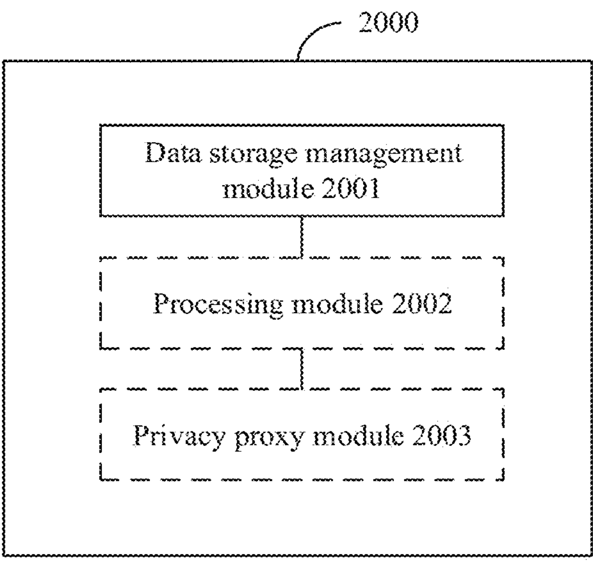
FIG. 20 is a schematic diagram of a structure of an apparatus 2000 according to an embodiment of this application.

FIG. 20 is a schematic diagram of a structure of an apparatus 2000 according to an embodiment of this application. As shown in FIG. 20, the apparatus 2000 includes a data storage management module 2001. Optionally, the apparatus 2000 further includes a processing module 2002 and/or a privacy proxy module 2003. The apparatus 2000 may be the vehicle in the foregoing embodiment, or may be a component (for example, an in-vehicle device or a chip) of the vehicle, or may be a storage management device disposed in a cloud server. For example, if the apparatus 2000 is a vehicle, the apparatus 2000 may include a data storage management module 2001, a processing module 2002, and a privacy proxy module 2003. If the apparatus 2000 is a device disposed in a server, the apparatus 2000 may include a data storage management module 2001 and a privacy proxy module 2003, and the processing module 2002 is disposed in a vehicle. It should be understood that the foregoing modules may be distributed in another manner. Examples are not provided herein one by one. The apparatus 2000 may implement steps or procedures performed by the vehicle corresponding to the foregoing method embodiments.

The processing module 2002 is configured to send the storage request information of a first business to the data storage management module 2001. Correspondingly, the data storage management module 2001 receives the storage request information sent by the processing module 2002. The storage request information includes to-be-stored first data, a data identifier of the first data, and storage rating information. The storage rating information indicates a privacy level corresponding to the data identifier of the first data.

The data storage management module 2001 is further configured to: store the first data; and when storage duration of the first data reaches a retention period, delete the first data. The retention period is determined based on the storage rating information.

In some examples, the apparatus 2000 further includes the privacy proxy module 2003. The data storage management module 2001 is further configured to send second query information to the privacy proxy module 2003. The second query information is used to query the retention period of the first data. The second query information includes the data identifier and the storage rating information of the first data. The privacy proxy module 2003 is configured to send first indication information to the data storage management module 2001. The first indication information indicates the retention period of the first data.

In some examples, the apparatus 2000 further includes the privacy proxy module 2003. The data storage management module 2001 is further configured to send second query information to the privacy proxy module 2003. The second query information includes the data identifier and storage rating information of the first data. The privacy proxy module 2003 is configured to: determine the retention period based on the storage rating information; and when the storage duration of the first data reaches the retention period, send deletion indication information to the data storage management module 2001. The deletion indication information indicates to delete the first data.

In some examples, the storage request information includes a first identifier. The first identifier includes at least one of the following: a client identifier and a process identifier. The client identifier is an identifier indicating a data invoker. The process identifier is an identifier of a business that is run as a process. The data storage management module 2001 is further configured to determine, based on the first identifier, whether the first business has a storage permission. The data storage management module 2001 is specifically configured to flush the data to a disk when determining that the first business has the storage permission.

Figure 21:
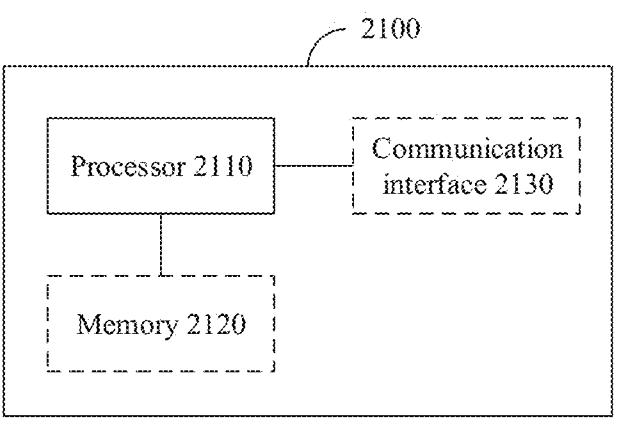
FIG. 21 is a schematic diagram of a structure of an apparatus 2100 according to an embodiment of this application.

FIG. 21 is a schematic block diagram of an apparatus 2100 according to another embodiment of this application. The apparatus 2100 includes a processor 2110. The processor 2110 is configured to: execute a computer program or instructions stored in a memory 2120, or read data stored in the memory 2120, to perform the methods in the foregoing method embodiments. Optionally, one or more processors 2110 are included.

Optionally, as shown in FIG. 21, the apparatus 2100 further includes a memory 2120. The memory 2120 is configured to store a computer program or instructions and/or data. Optionally, the memory 2120 may be integrated with the processor 2110, or the memory and the processor are disposed separately. Optionally, one or more memories 2120 are included.

Optionally, as shown in FIG. 21, the apparatus 2100 further includes a communication interface 2130. The communication interface 2130 is configured to receive and/or send a signal. For example, the processor 2110 is configured to control the communication interface 2130 to receive and/or send a signal.

Optionally, the apparatus 2100 is configured to implement operations performed by modules disposed in the vehicle or the cloud server in the foregoing method embodiments. For example, the processor 2110 is configured to execute the computer program or instructions stored in the memory 2120, to implement related operations of the modules in the vehicle in the foregoing method embodiments. For example, a method performed by a module in the vehicle in embodiments shown in FIG. 6, FIG. 7, and FIG. 11 to FIG. 17.

For example, the processor 2110 is configured to execute the computer program or instructions stored in the memory 2120, to implement related operations of modules of the cloud server in the foregoing method embodiments, for example the methods performed by the data storage management module and the privacy proxy module in the embodiments shown in FIG. 6, FIG. 7, and FIG. 11 to FIG. 17.

It should be noted that the apparatus 2100 in FIG. 21 may be the vehicle in the foregoing embodiments, or may be a component (for example, an in-vehicle device or a chip) of the vehicle, or may be the cloud server, or may be a component (for example, a device or a chip used for storage management) of the cloud server. This is not limited herein.

A person of ordinary skill in the art may be aware that the units and algorithm steps described with reference to examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both an application that runs on a computing device and the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or a network, for example, an Internet interacting with another system by using a signal).

A person of ordinary skill in the art may be aware that the units and algorithm steps described with reference to examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. The parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing module, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for managing data, wherein the method is applied to a vehicle, the vehicle comprises a privacy center module, a privacy proxy module, and a middleware module, the privacy center module is configured to implement a privacy configuration function, the privacy proxy module is configured to implement a privacy control function, the middleware module is configured to provide, for a business, an interface that is based on a service-oriented architecture (SOA), and the method comprises:

obtaining, by the privacy center module, a privacy configuration file;

obtaining, by the privacy center module, a privacy policy file based on the privacy configuration file, wherein the privacy policy file comprises at least one of the following: first configuration information indicating an access permission between a business and a service or an access permission between businesses, or second configuration information indicating an access permission of a business; and sending, by the privacy center module, the privacy policy file to the privacy proxy module, wherein the privacy policy file is used for access control of the middleware module.

2. The method according to claim 1, wherein the obtaining, by the privacy center module, a privacy policy file based on the privacy configuration file comprises:

presenting, by the privacy center module, a privacy configuration option to a user in a display interface based on the privacy configuration file, wherein the privacy configuration option is used by the user to select at least one of the following: whether to authorize a business to invoke data of at least one service, or whether to authorize the business to invoke data of at least one other business;

obtaining, by the privacy center module, a result of selection performed by the user on the privacy configuration option; and obtaining, by the privacy center module, the privacy policy file based on the result of the selection.

3. The method according to claim 1, wherein the privacy configuration file comprises privacy rating information, the privacy rating information indicates privacy levels of data corresponding to different service identifiers, and a service identifier is an identifier indicating a data provider.

4. The method according to claim 3, wherein quantization values are used in the privacy rating information to distinguish between the privacy levels of data.

5. The method according to claim 1, wherein the first configuration information comprises at least one of the following:

information indicating a first association relationship between a service identifier of a service that is allowed to provide data and a client identifier of a business that is allowed to collect data; or information indicating a second association relationship between a service identifier of a business that is allowed to provide shared data and a client identifier of a business that is allowed to obtain shared data, wherein the client identifier is an identifier indicating a data invoker, and the service identifier is an identifier indicating a data provider.

6. The method according to claim 1, wherein the second configuration information comprises at least one of the following:

a client identifier of a business that is allowed to collect data;

a client identifier or a process identifier of a business that is allowed to transmit data to an outside of the vehicle;

a service identifier of a service that is allowed to provide data; or a service identifier of a business that is allowed to provide shared data, wherein the client identifier of a business that is allowed to collect data or that is allowed to transmit data to the outside of the vehicle is an identifier indicating a data invoker, the service identifier of a business that is allowed to provide data or that is allowed to provide shared data is an identifier indicating a data provider, and the process identifier of a business that is allowed to transmit data to the outside of the vehicle is an identifier of a business that is run as a process.

7. The method according to claim 1, wherein the privacy configuration file comprises at least one of the following:

an identifier defining a business;

an identifier defining a service;

an identifier defining a different data life cycle stage;

information indicating an association relationship between a business and a service; or information indicating an association relationship between businesses.

8. The method according to claim 7, wherein the identifier defining a business comprises at least one of the following: an identifier defining the business in a different data life cycle stage or an identifier defining the business in a different communication protocol; and the identifier defining a service comprises at least one of the following: an identifier defining the service in a different data life cycle stage or an identifier defining the service in a different communication protocol.

9. An in-vehicle device, wherein the in-vehicle device comprises at least one processor and one or more memories storing programing instructions of a privacy center module, a privacy proxy module, and a middleware module, wherein:

the one or more memories store programming instructions of the privacy center module for execution by the at least one processor to:

obtain a privacy configuration file;

obtain a privacy policy file based on the privacy configuration file, wherein the privacy policy file comprises at least one of the following: first configuration information indicating an access permission between a business and a service or an access permission between businesses, or second configuration information indicating an access permission of a business; and send the privacy policy file to the privacy proxy module, wherein the privacy policy file is used for access control of the middleware module, and the one or more memories store programming instructions of the middleware module for execution by the at least one processor to provide, for a business, an interface that is based on a service-oriented architecture (SOA).

10. The in-vehicle device according to claim 9, wherein the one or more memories store programming instructions of the privacy center module for execution by the at least one processor to:

present a privacy configuration option to a user in a display interface based on the privacy configuration file, wherein the privacy configuration option is used by the user to select at least one of the following: whether to authorize a business to invoke data of at least one service, or whether to authorize the business to invoke data of at least one other business;

obtain a result of selection performed by the user on the privacy configuration option; and obtain the privacy policy file based on the result of the selection.

11. The in-vehicle device according to claim 9, wherein the privacy configuration file comprises privacy rating information, the privacy rating information indicates privacy levels of data corresponding to different service identifiers, and a service identifier is an identifier indicating a data provider.

12. The in-vehicle device according to claim 11, wherein quantization values are used in the privacy rating information to distinguish between the privacy levels of data.

13. The in-vehicle device according to claim 9, wherein the first configuration information comprises at least one of the following:

information indicating a first association relationship between a service identifier of a service that is allowed to provide data and a client identifier of a business that is allowed to collect data; or information indicating a second association relationship between a service identifier of a business that is allowed to provide shared data and a client identifier of a business that is allowed to obtain shared data, wherein the client identifier is an identifier indicating a data invoker, and the service identifier is an identifier indicating a data provider.

14. The in-vehicle device according to claim 9, wherein the second configuration information comprises at least one of the following:

a client identifier of a business that is allowed to collect data;

a client identifier or a process identifier of a business that is allowed to transmit data to an outside of a vehicle;

a service identifier of a service that is allowed to provide data; or a service identifier of a business that is allowed to provide shared data, wherein the client identifier of a business that is allowed to collect data or that is allowed to transmit data to the outside of the vehicle is an identifier indicating a data invoker, the service identifier of a business that is allowed to provide data or that is allowed to provide shared data is an identifier indicating a data provider, and the process identifier of a business that is allowed to transmit data to the outside of the vehicle is an identifier of a business that is run as a process.

15. The in-vehicle device according to claim 9, wherein the privacy configuration file comprises at least one of the following:

an identifier defining a business;

an identifier defining a service;

an identifier defining a different data life cycle stage;

information indicating an association relationship between a business and a service; or information indicating an association relationship between businesses.

16. The in-vehicle device according to claim 15, wherein the identifier defining a business comprises at least one of the following: an identifier defining the business in a different data life cycle stage or an identifier defining the business in a different communication protocol; and the identifier defining a service comprises at least one of the following: an identifier defining the service in a different data life cycle stage or an identifier defining the service in a different communication protocol.

17. An in-vehicle device, wherein the in-vehicle device comprises at least one processor and one or more memories storing programming instructions of a processing module, a privacy proxy module, and a middleware module, wherein:

the one or more memories store programming instructions of the processing module for execution by the at least one processor to send first request information to the middleware module, wherein:

the first request information is used to request to invoke first data for a first business, the first request information comprises a first identifier, the first identifier comprises at least one of the following: a client identifier of the first business, a process identifier of the first business, or a service identifier of a provider of the first data, the client identifier is an identifier indicating a data invoker, the service identifier is an identifier indicating a data provider, and the process identifier is an identifier of a business that is run as a process;

the one or more memories store programming instructions of the middleware module for execution by the at least one processor to:

send first query information to the privacy proxy module, wherein the first query information is used to query whether invocation of the first data for the first business is approved, and the first query information comprises the first identifier; and provide, for a business in the in-vehicle device, an interface that is based on a service-oriented architecture (SOA); and the one or more memories store programming instructions of the privacy proxy module for execution by the at least one processor to send first response information to the middleware module, wherein:

the first response information indicates whether invocation of the first data for the first business is approved, the first response information is determined based on the first identifier and a privacy policy file, and the privacy policy file comprises at least one of the following: first configuration information indicating an access permission between a business and a service or an access permission between businesses, or second configuration information indicating an access permission of a business.

18. The in-vehicle device according to claim 17, wherein the first configuration information comprises at least one of the following:

information indicating a first association relationship between a service identifier of a service that is allowed to provide data and a client identifier of a business that is allowed to collect data; or information indicating a second association relationship between a service identifier of a business that is allowed to provide shared data and a client identifier of a business that is allowed to obtain shared data.

19. The in-vehicle device according to claim 17, wherein the second configuration information comprises at least one of the following:

a client identifier of a business that is allowed to collect data;

a client identifier or a process identifier of a business that is allowed to transmit data to the outside of a vehicle;

a service identifier of a service that is allowed to provide data; or a service identifier of a business that is allowed to provide shared data.

20. A non-transitory computer-readable storage medium, the non-transitory computer-readable storage medium storing programming instructions for execution by at least one processor to perform a method, wherein the method is applied to a vehicle, the vehicle comprises a privacy center module, a privacy proxy module, and a middleware module, the privacy center module is configured to implement a privacy configuration function, the privacy proxy module is configured to implement a privacy control function, the middleware module is configured to provide, for a business, an interface that is based on a service-oriented architecture (SOA), and the method comprises:

obtaining, by the privacy center module, a privacy configuration file;

obtaining, by the privacy center module, a privacy policy file based on the privacy configuration file, wherein the privacy policy file comprises at least one of the following: first configuration information indicating an access permission between a business and a service or an access permission between businesses, or second configuration information indicating an access permission of a business; and sending, by the privacy center module, the privacy policy file to the privacy proxy module, wherein the privacy policy file is used for access control of the middleware module.

* * * * *